United States Patent
Koo et al.

(10) Patent No.: US 11,350,130 B2
(45) Date of Patent: May 31, 2022

(54) METHOD AND APPARATUS FOR PROCESSING VIDEO SIGNAL BY USING APPROXIMATION TRANSFORM ON BASIS OF PREPROCESSING/POSTPROCESSING MATRIX

(71) Applicant: LG Electronics Inc., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/047,849

(22) PCT Filed: Apr. 17, 2019

(86) PCT No.: PCT/KR2019/004644
§ 371 (c)(1),
(2) Date: Oct. 15, 2020

(87) PCT Pub. No.: WO2019/203569
PCT Pub. Date: Oct. 24, 2019

(65) Prior Publication Data
US 2021/0218996 A1    Jul. 15, 2021

Related U.S. Application Data

(60) Provisional application No. 62/658,607, filed on Apr. 17, 2018.

(51) Int. Cl.
*H04N 19/00* (2014.01)
*H04N 19/61* (2014.01)
(Continued)

(52) U.S. Cl.
CPC .......... *H04N 19/61* (2014.11); *H04N 19/159* (2014.11); *H04N 19/176* (2014.11); *H04N 19/625* (2014.11)

(58) Field of Classification Search
CPC .......... H04N 19/00; H04N 11/00; H04N 7/00; H04N 5/00
See application file for complete search history.

(56) References Cited

U.S. PATENT DOCUMENTS

| 11,039,139 B2* | 6/2021 | Zhao | H04N 19/18 |
| 2012/0057630 A1* | 3/2012 | Saxena | H04N 19/61 |
| | | | 375/240.03 |

(Continued)

FOREIGN PATENT DOCUMENTS

| KR | 10-2013-0098360 A | 9/2013 |
| KR | 10-1412964 B1 | 6/2014 |

(Continued)

*Primary Examiner* — Maryam A Nasri
(74) *Attorney, Agent, or Firm* — Dentons US LLP

(57) ABSTRACT

The present invention provides a method for reconstructing a video signal by using an approximation transform on the basis of a preprocessing/postprocessing matrix, the method comprising: obtaining a transform index of a current block from a video signal, wherein the transform index corresponds to any one of a plurality of transform combinations including at least one of DST7, DCT8, DST6, or flipped DST7, and a transform combination includes a horizontal transform and a vertical transform; deriving a primary transform for horizontal/vertical directions corresponding to the transform index; performing an inverse primary approximation transform by using the primary transform for the horizontal/vertical directions, wherein the inverse primary approximation transform is generated by multiplying the primary transform for the horizontal/vertical directions by a preprocessing matrix and a postprocessing matrix; and (Continued)

reconstructing the video signal by using the inverse primary approximation-transformed current block.

14 Claims, 23 Drawing Sheets

(51) Int. Cl.
*H04N 19/159* (2014.01)
*H04N 19/176* (2014.01)
*H04N 19/625* (2014.01)

(56) References Cited

U.S. PATENT DOCUMENTS

2015/0172718 A1* 6/2015 Budagavi ............... H04N 19/61
375/240.18
2019/0306522 A1* 10/2019 Said ........................ G06F 17/16

FOREIGN PATENT DOCUMENTS

| KR | 10-2015-0050680 A | 5/2015 |
| KR | 10-2017-0051540 A | 5/2017 |

* cited by examiner

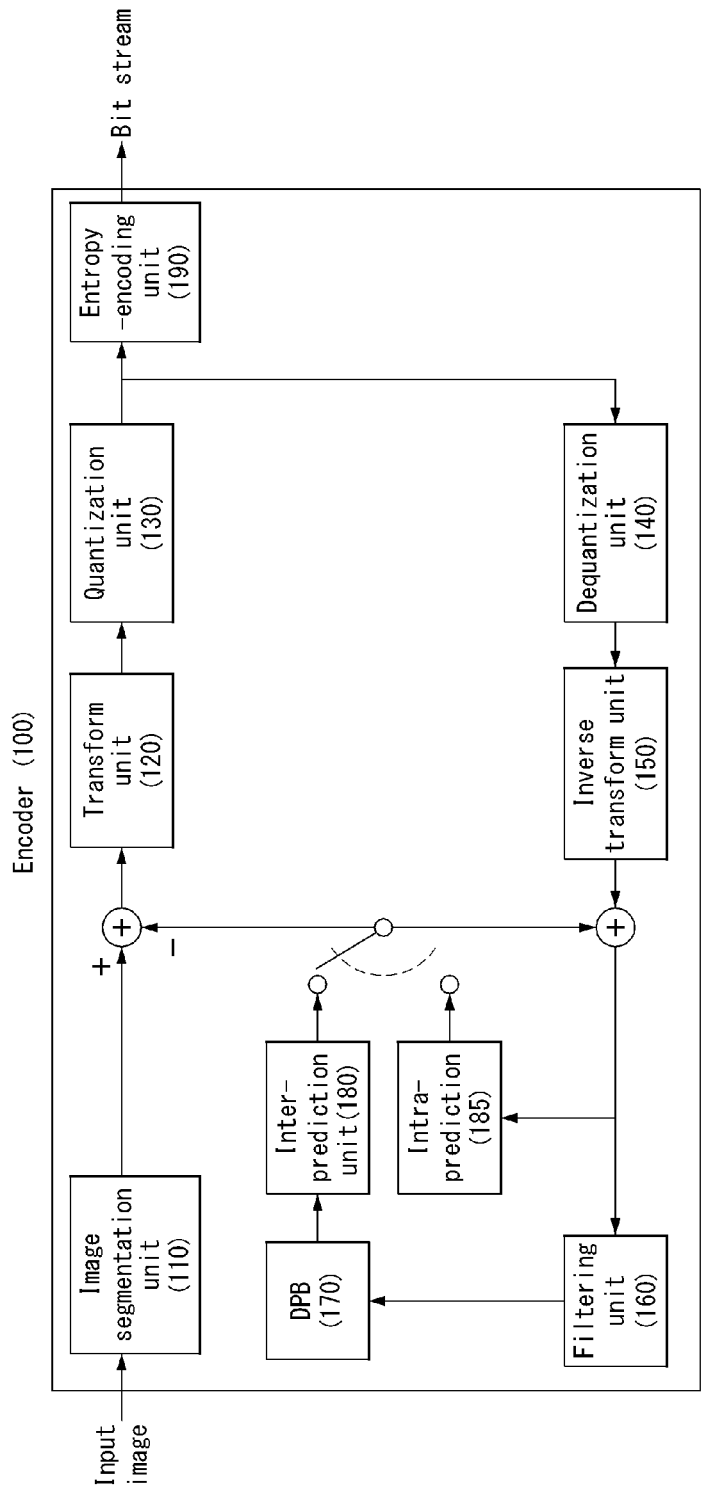
[FIG. 1]

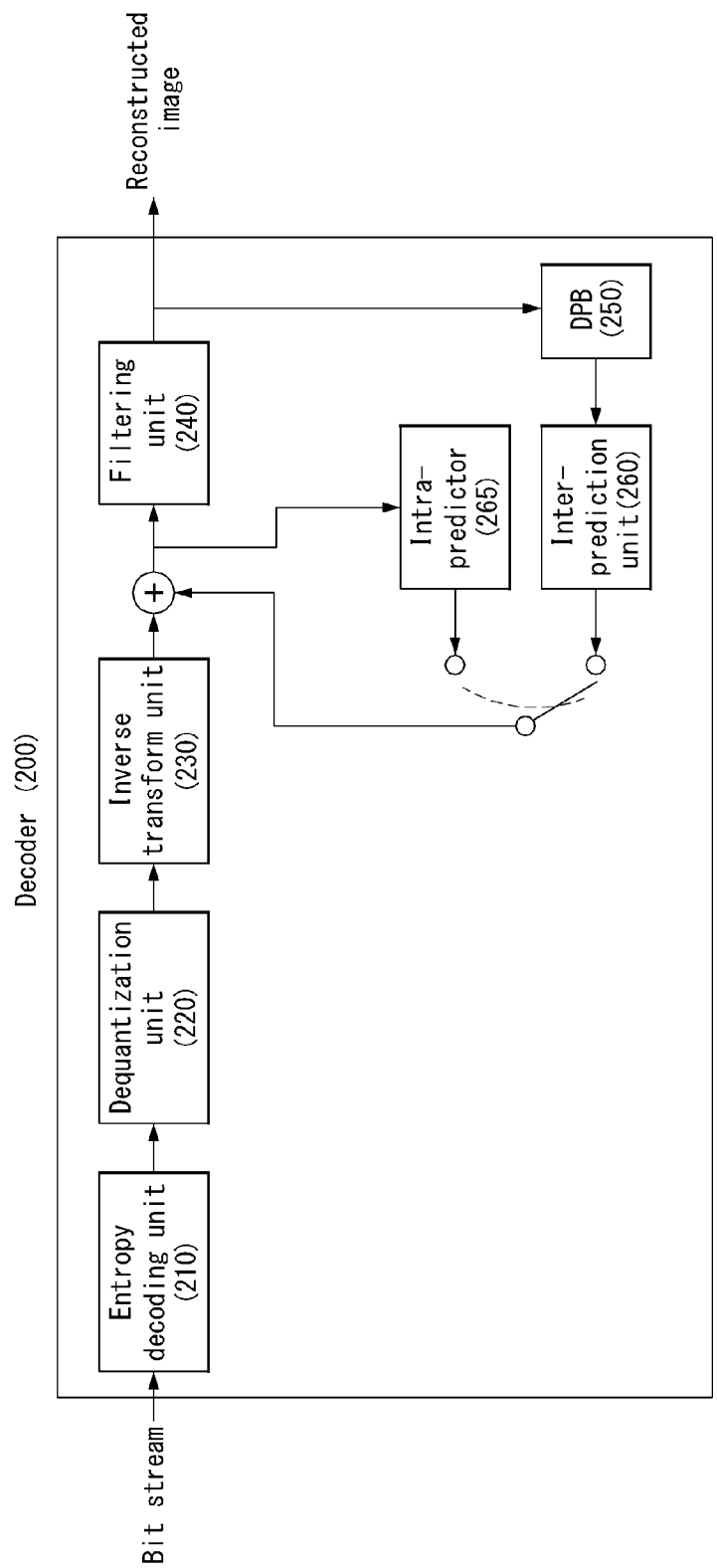
[FIG. 2]

[FIG. 3A]
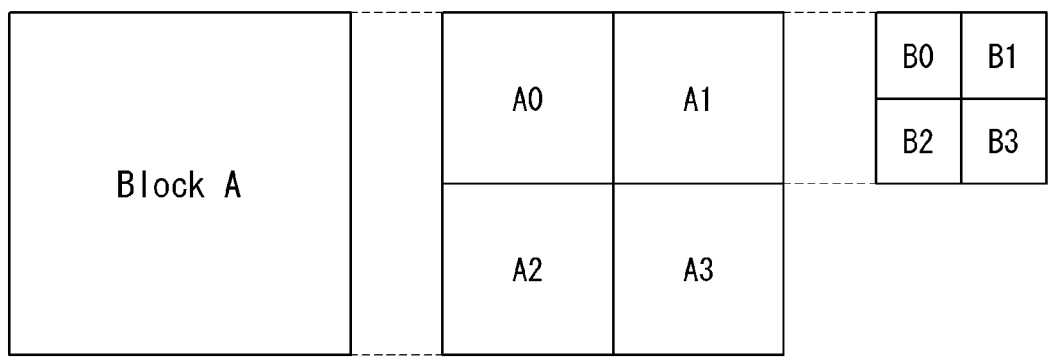
[FIG. 3B]
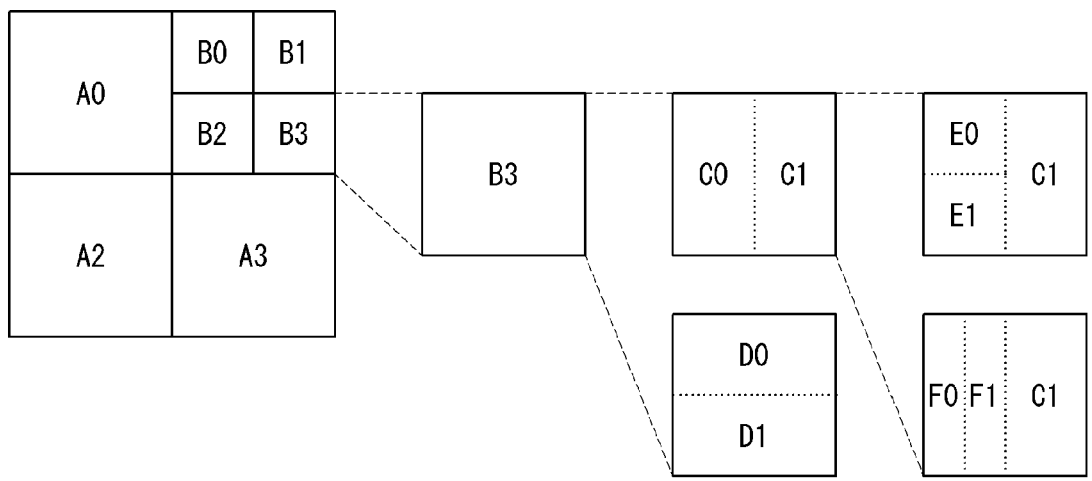

[FIG. 3C]
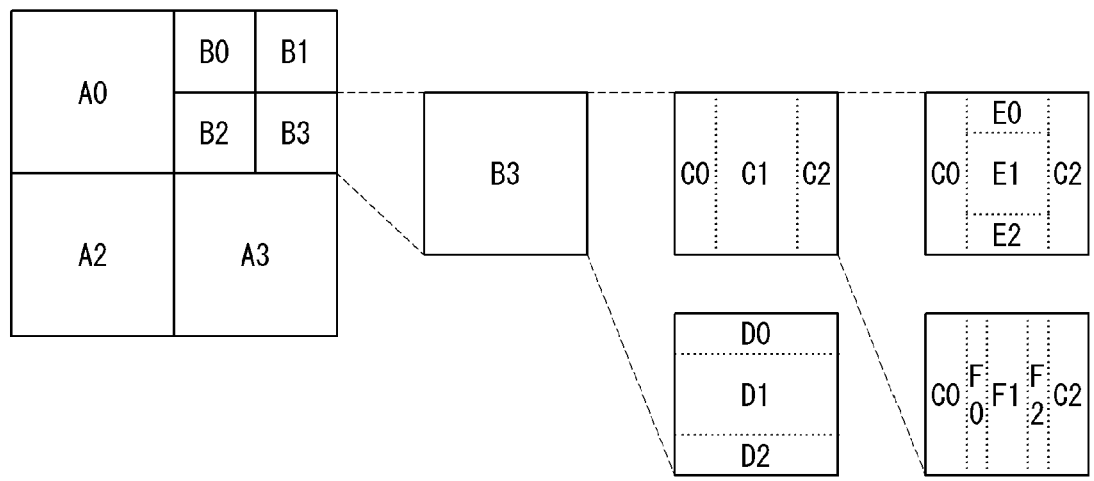
[FIG. 3D]
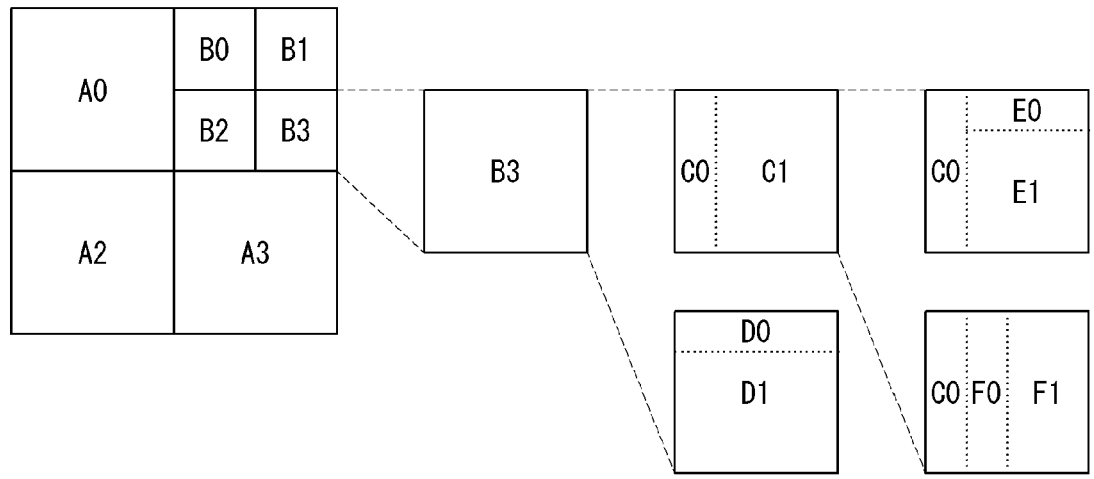

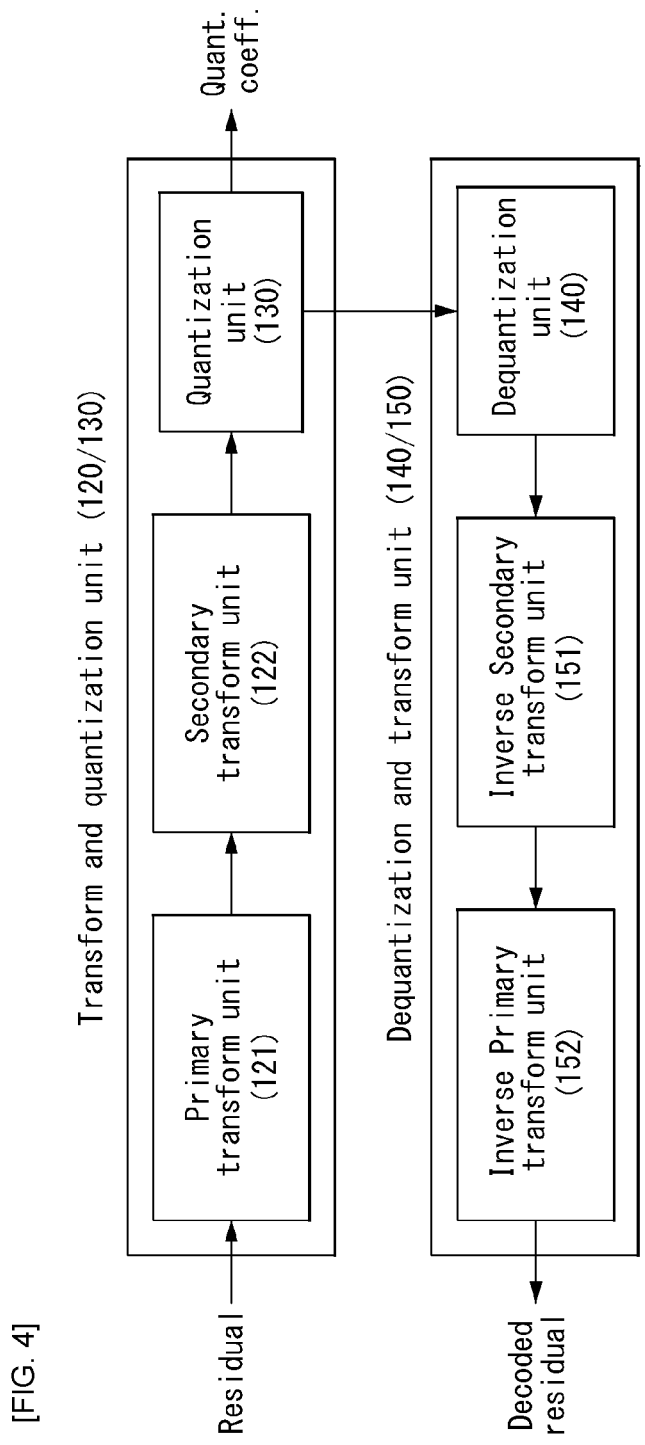
[FIG. 4]

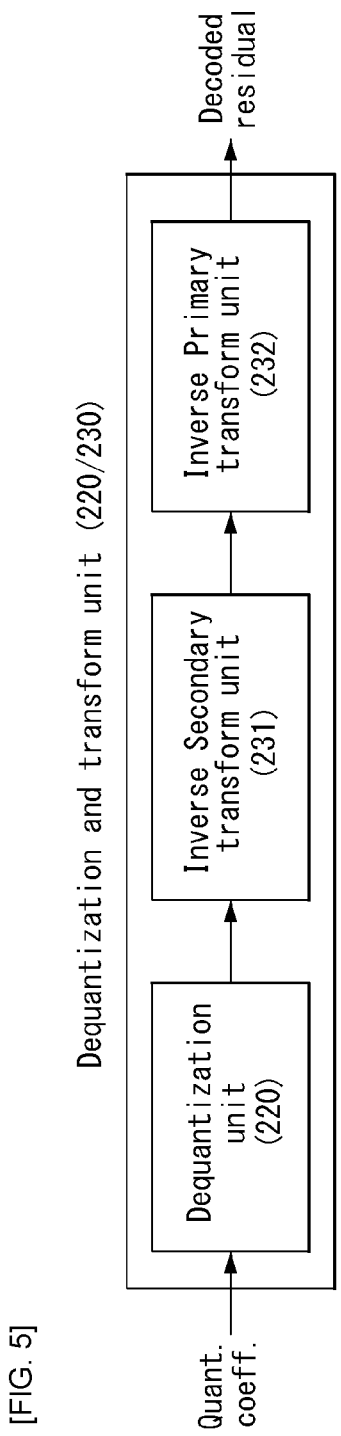
[FIG. 5]

[FIG. 6]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST1 | | |
| | 2 | DST7 | DST1 | | |
| | 3 | DST1 | DST7 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DCT8 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

[FIG. 7]
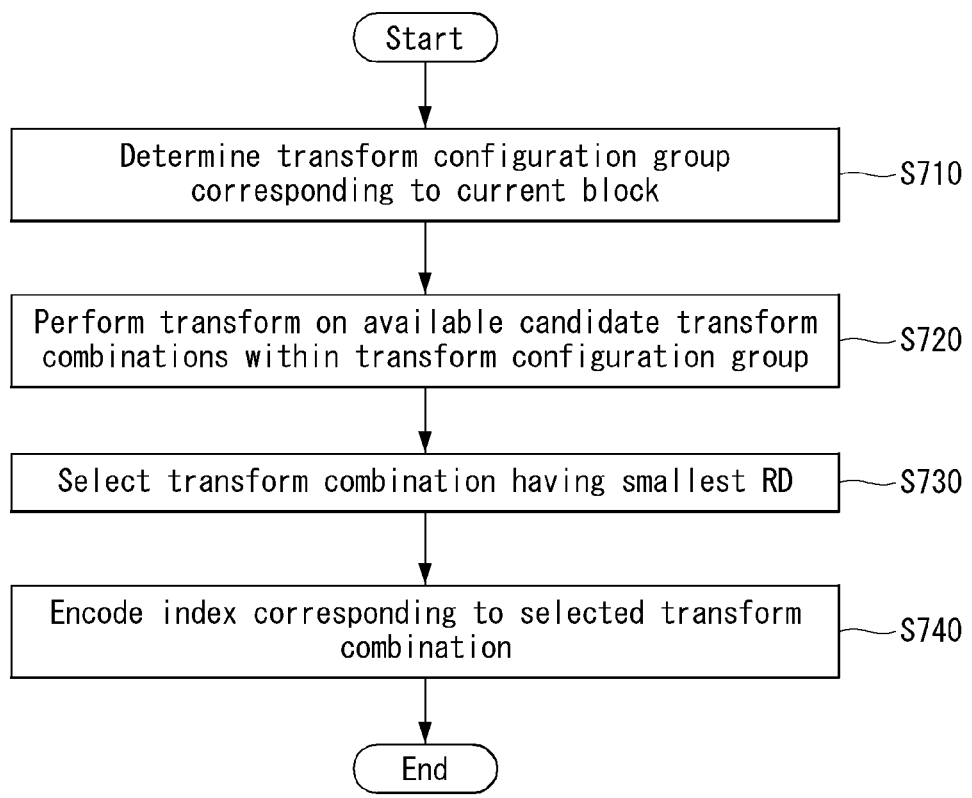

[FIG. 8]
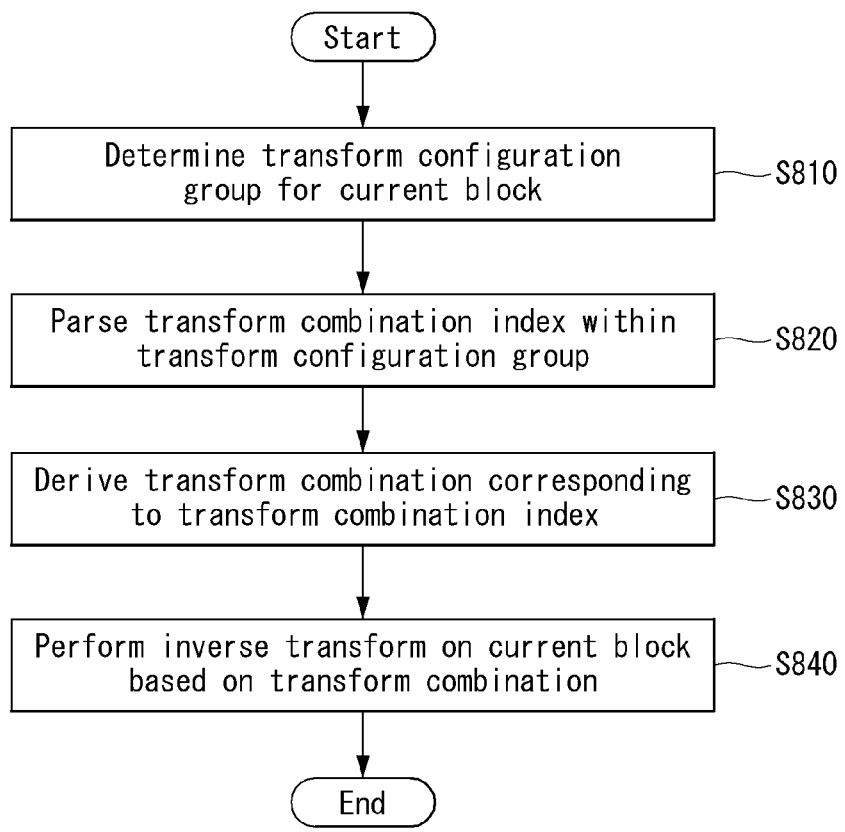

[FIG. 9]
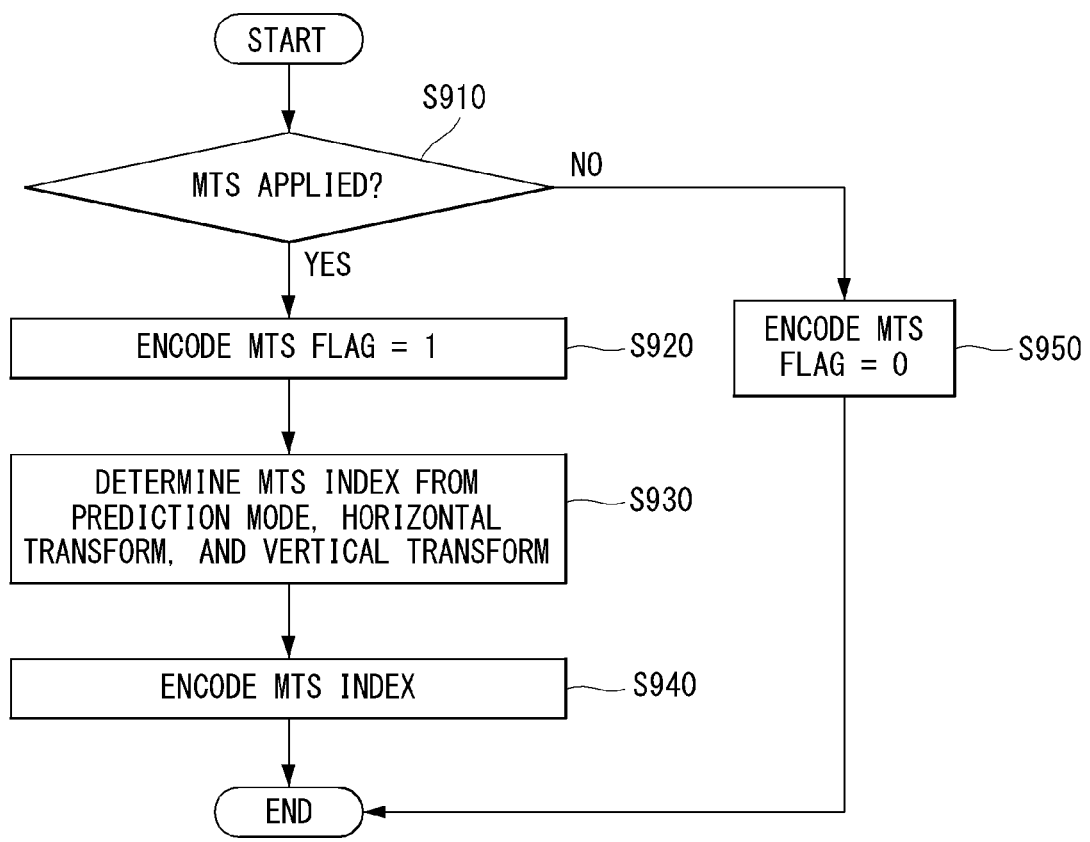

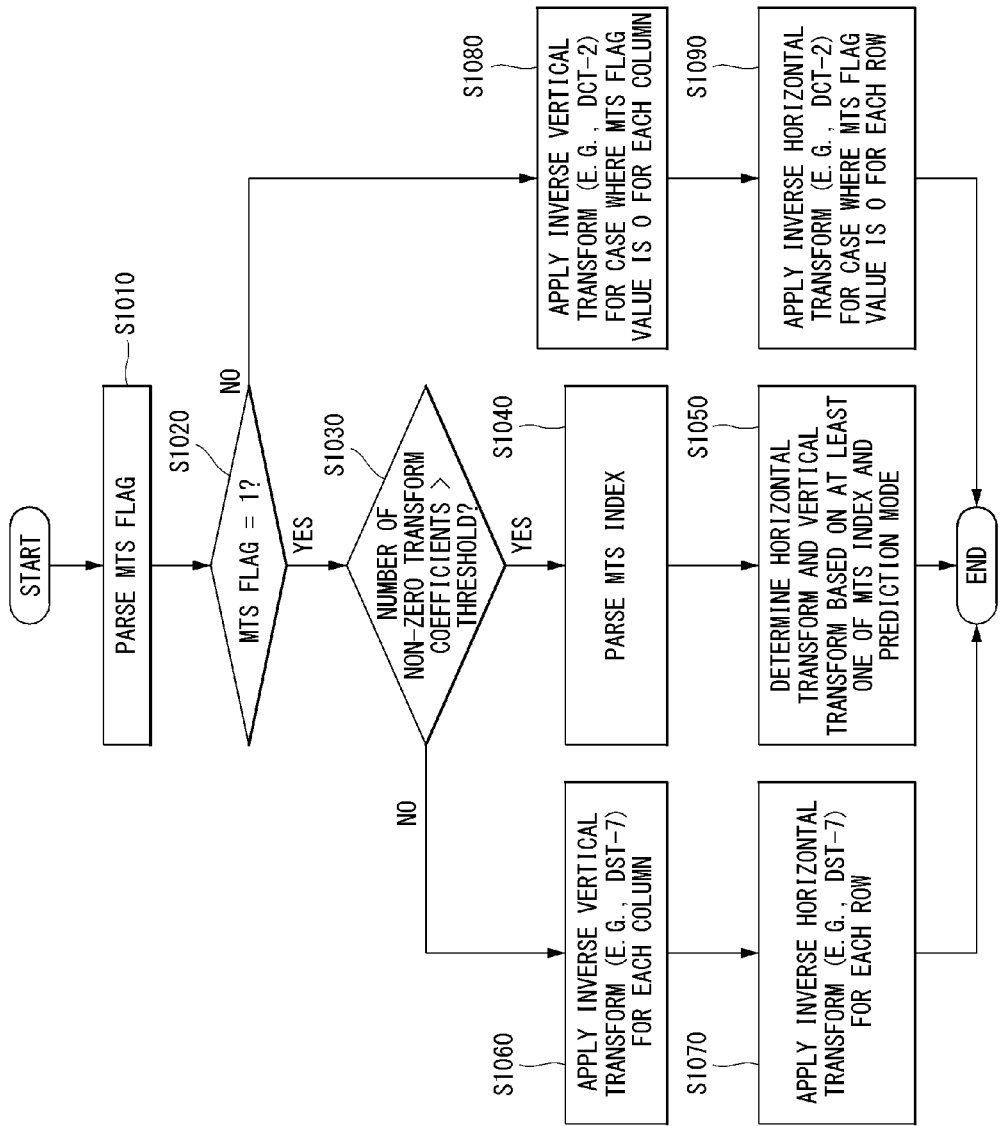
[FIG. 10]

[FIG. 11]
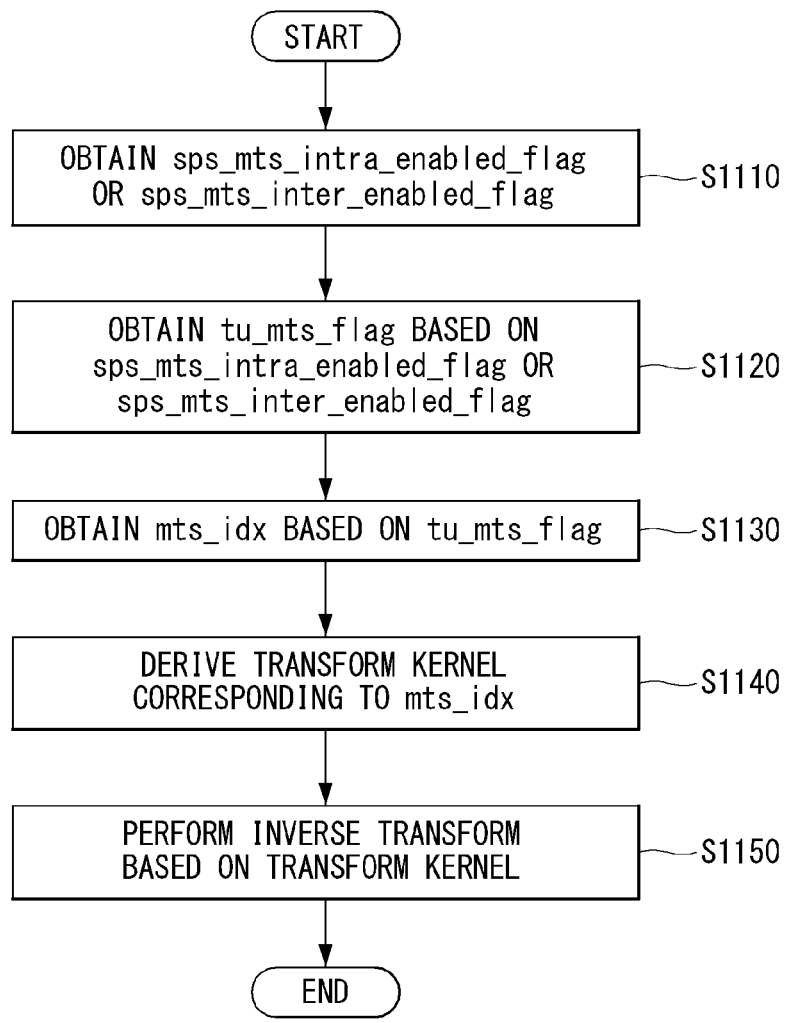

[FIG. 12]

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

[FIG. 13]
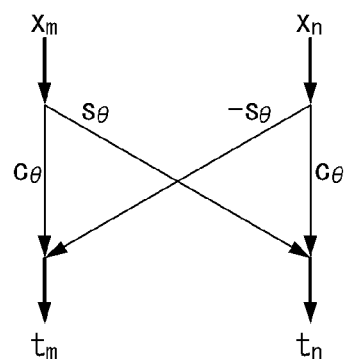

[FIG. 14]
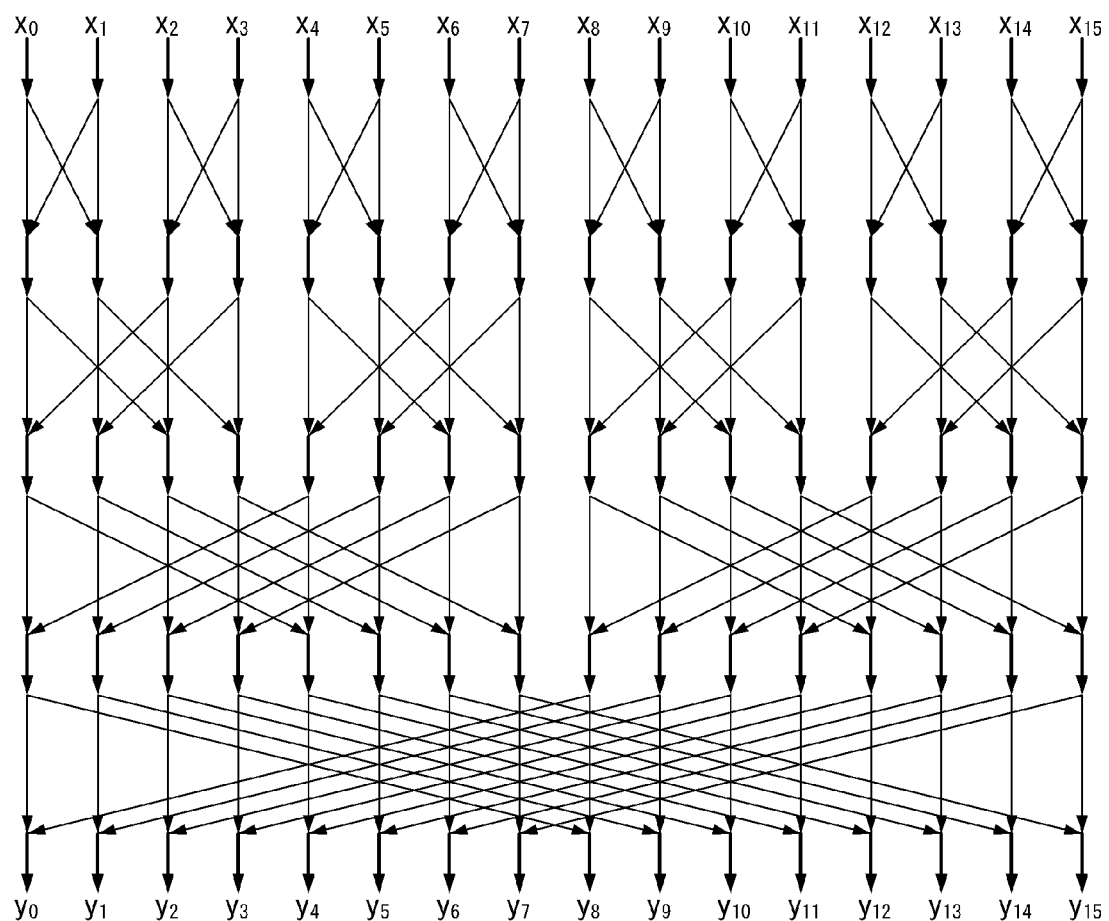

[FIG. 15]
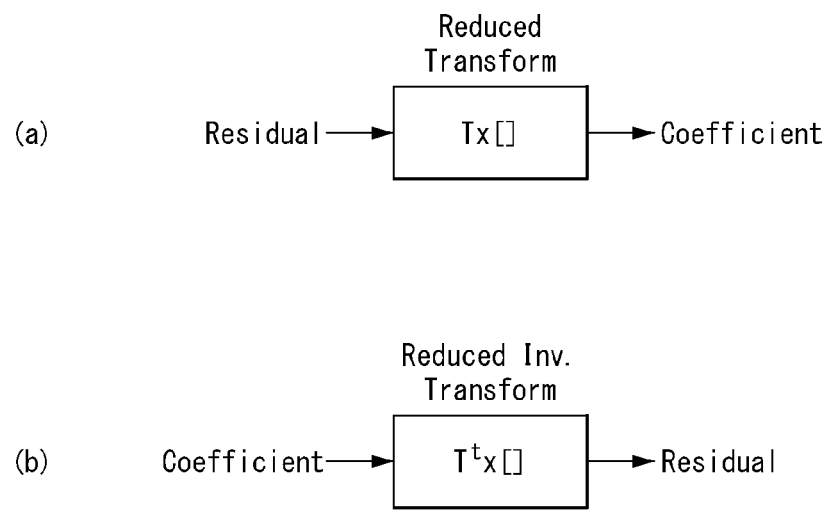

[FIG. 16]
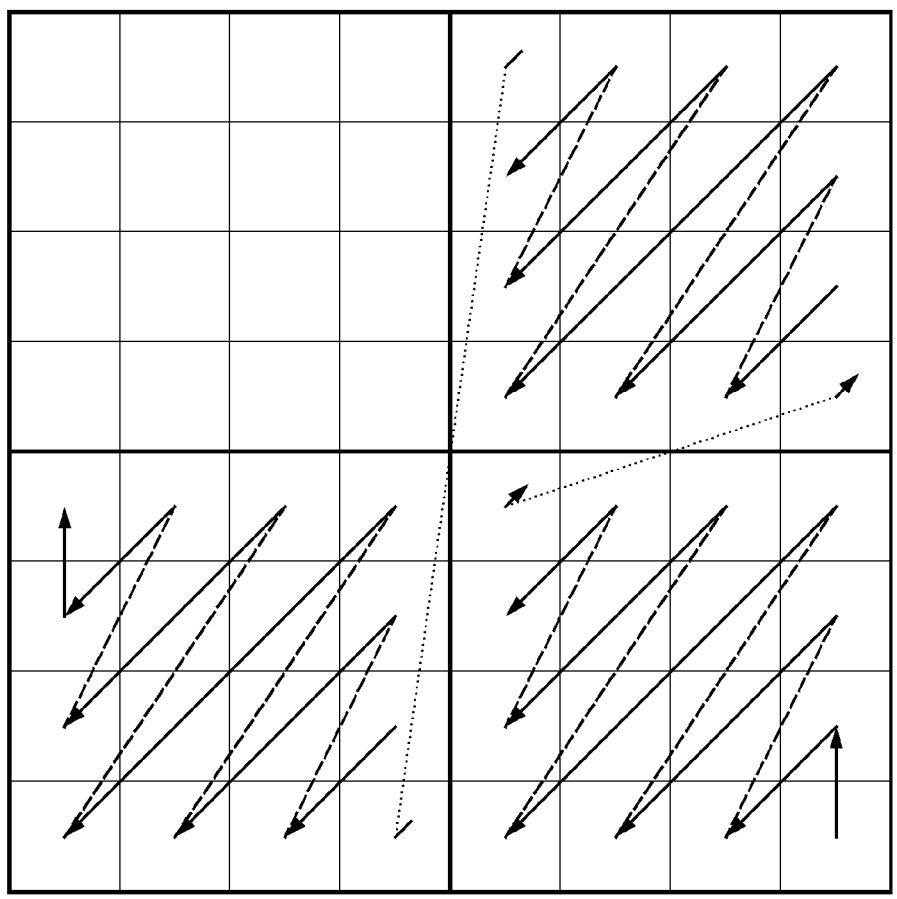

[FIG. 17]
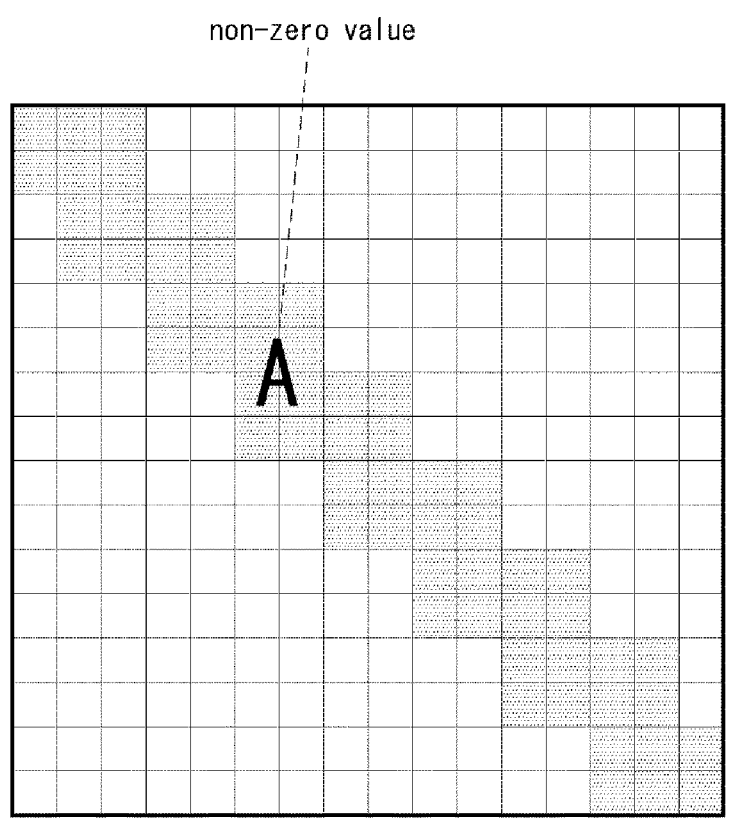

[FIG. 18]

| MTS index | Hor. Transform | Ver. Transform |
|---|---|---|
| 0 | DST7 | DST7 |
| 1 | DCT8 | DST7 |
| 2 | DST7 | DCT8 |
| 3 | DCT8 | DCT8 |

[FIG. 19]

| MTS index | Hor. Transform | Ver. Transform |
|---|---|---|
| 0 | DCT8 | DCT8 |
| 1 | DST7 | DCT8 |
| 2 | DCT8 | DST7 |
| 3 | DST7 | DST7 |

[FIG. 20]
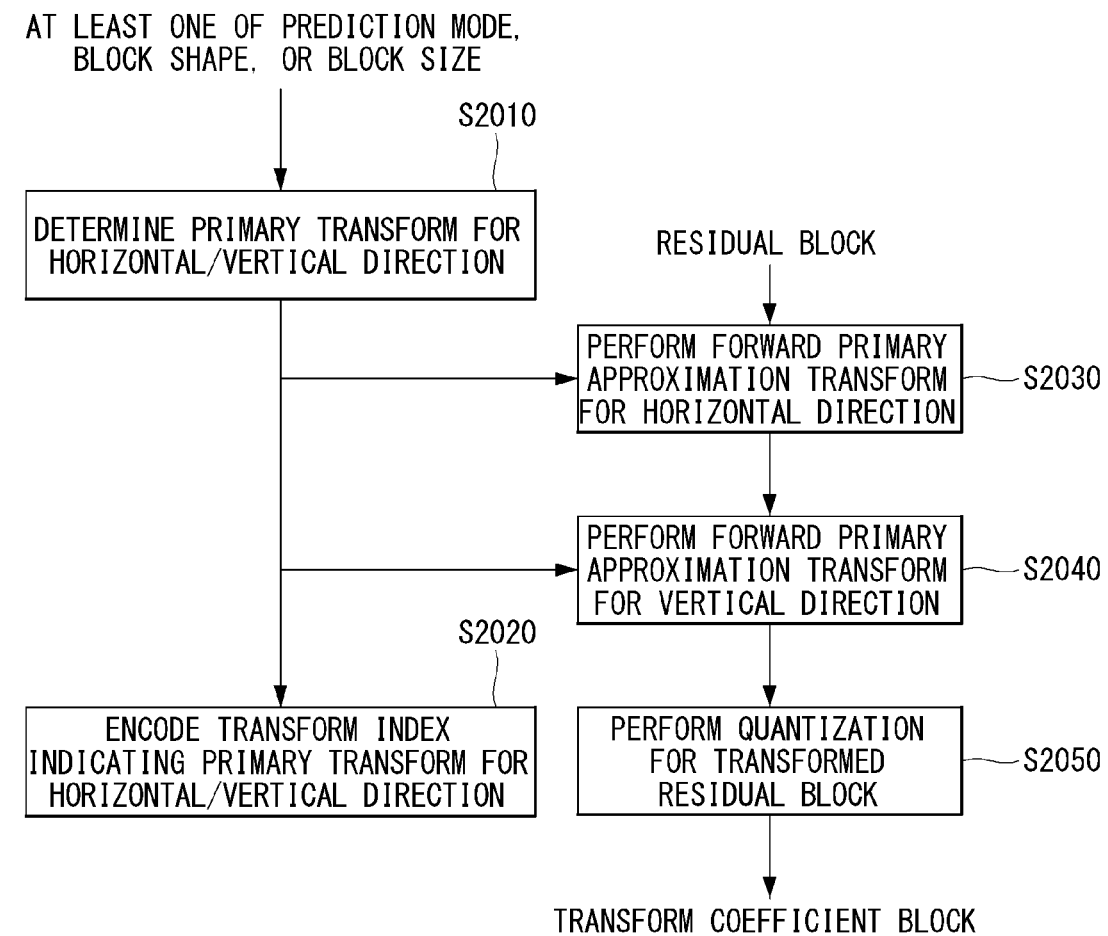

[FIG. 21]
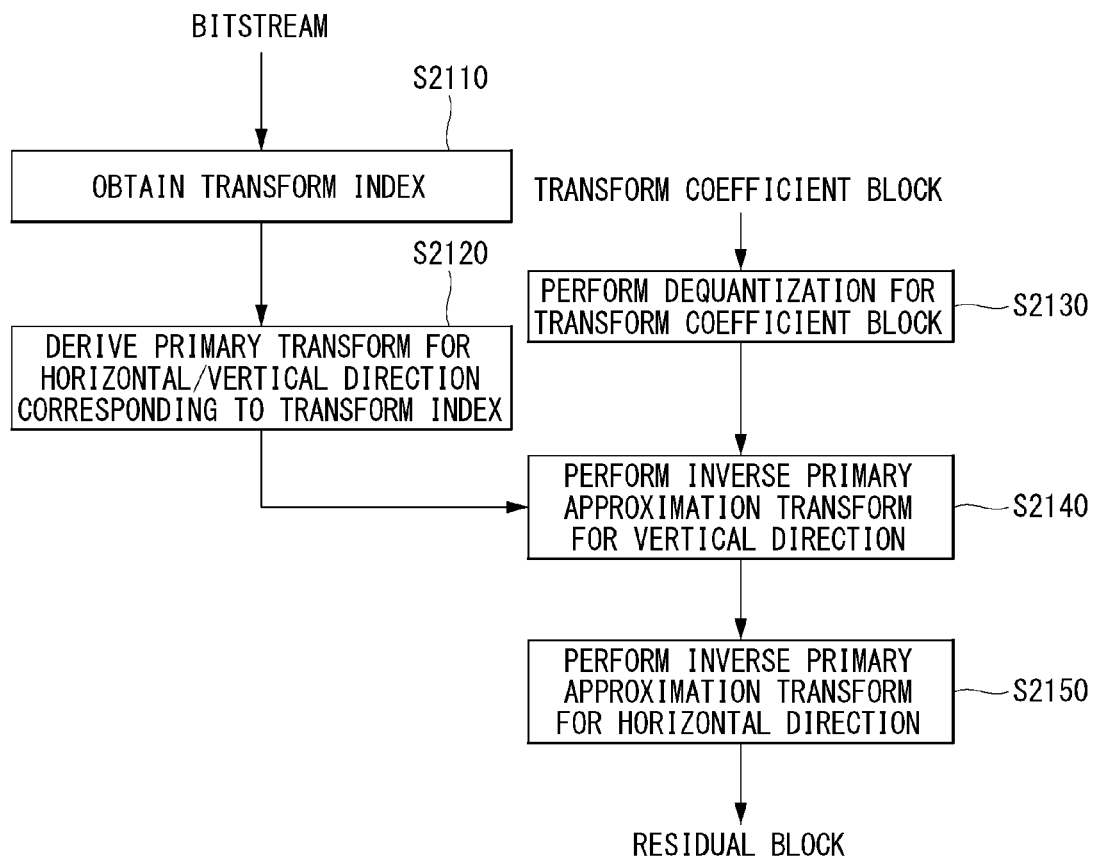

[FIG. 22]
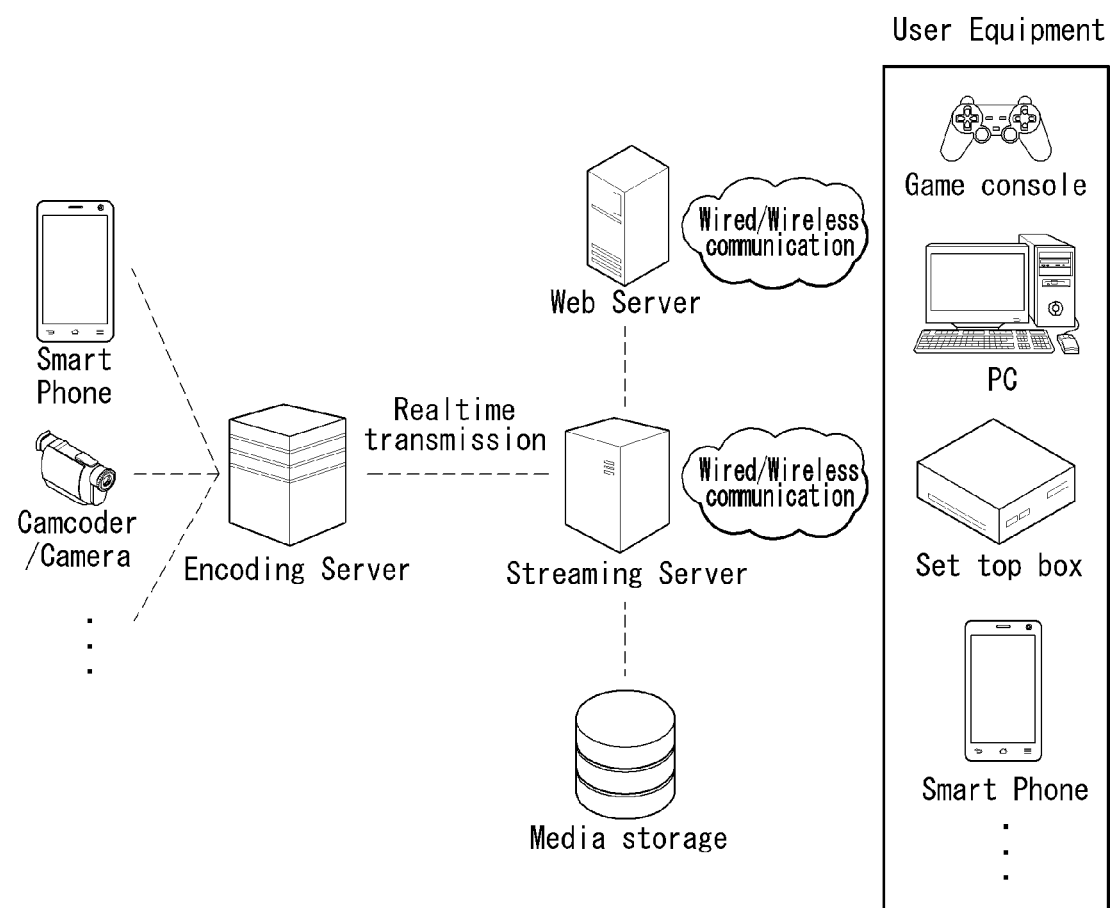

METHOD AND APPARATUS FOR PROCESSING VIDEO SIGNAL BY USING APPROXIMATION TRANSFORM ON BASIS OF PREPROCESSING/POSTPROCESSING MATRIX

CROSS-REFERENCE TO RELATED APPLICATIONS

This application is the National Stage filing under 35 U.S.C. 371 of International Application No. PCT/KR2019/004644, filed on Apr. 17, 2019, which claims the benefit of U.S. Provisional Application No. 62/658,607 filed on Apr. 17, 2018, the contents of which are all hereby incorporated by reference herein in their entirety.

TECHNICAL FIELD

The present disclosure relates to a method and an apparatus for processing a video signal, and more particularly, to a technology of approximating a specific cosine transform or a specific sine transform by adding a preprocessing step and a postprocessing step to a cosine transform or a sine transform.

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

DISCLOSURE

Technical Problem

An embodiment of the present disclosure provides an encoder/decoder structure for reflecting a new transform design.

Furthermore, an embodiment of the present disclosure provides a method for approximating a specific cosine transform or a specific sine transform by adding a preprocessing step and a postprocessing step to a cosine transform or a sine transform.

Technical Solution

The present disclosure provides a method for reducing complexity and enhancing coding efficiency through a new transform design.

The present disclosure provides a method for configuring an additional transform span set.

Furthermore, the present disclosure provides a method for generating a new transform or approximating a specific trigonometric transform by adding a preprocessing step (expressed by a preprocessing matrix product) and a postprocessing step (expressed by a postprocessing matrix product) to a trigonometric transform (cosine transform or sine transform).

Furthermore, the present disclosure provides a method for reducing a memory by sharing a preprocessing matrix and a postprocessing matrix required for approximating corresponding transforms at the time of approximating multiple transforms.

Furthermore, the present disclosure provides a method for applying approximation transforms based on a preprocessing matrix and/or a postprocessing matrix to multiple transform selection (MTS).

Furthermore, the present disclosure provides a method for selectively applying a preprocessing step and/or a postprocessing step according to a case.

Advantageous Effects

According to the present disclosure, when a cosine transform or a sine transform is applied in video coding, a target cosine transform or a target sine transform is approximately implemented by using a cosine transform or a sine transform having lower complexity to reduce a calculation amount and memories required.

Furthermore, a preprocessing matrix and/or a postprocessing matrix used for various target cosine transforms or target sine transforms are shared to reduce a required memory amount.

DESCRIPTION OF DRAWINGS

FIG. 1 is a block diagram illustrating the configuration of an encoder for encoding a video signal according to an embodiment of the present disclosure.

FIG. 2 is a block diagram illustrating the configuration of a decoder for decoding a video signal according to an embodiment of the present disclosure.

FIG. 3 illustrates embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

FIG. 4 is an embodiment to which the disclosure is applied and illustrates a schematic block diagram of a transform and quantization unit 120/130 and a dequantization and transform unit 140/150 within an encoder.

FIG. 5 is an embodiment to which the disclosure is applied and illustrates a schematic block diagram of a dequantization and transform unit 220/230 within a decoder.

FIG. 6 is a table showing a transform configuration group to which Multiple Transform Selection (MTS) is applied as an embodiment to which the present disclosure is applied.

FIG. 7 is a flowchart showing an encoding process in which Multiple Transform Selection (MTS) is performed as an embodiment to which the present disclosure is applied.

FIG. 8 is a flowchart showing a decoding process in which Multiple Transform Selection (MTS) is performed as an embodiment to which the present disclosure is applied.

FIG. 9 is a flowchart for describing a process of encoding an MTS flag and an MTS index as an embodiment to which the present disclosure is applied.

FIG. 10 is a flowchart for describing a decoding process in which a horizontal transform or vertical transform is applied to a row or a column based on an MTS flag and an MTS index as an embodiment to which the present disclosure is applied.

FIG. 11 is a flowchart of performing an inverse transform based on a transform related parameter as an embodiment to which the present disclosure is applied.

FIG. 12 is a table showing allocation of a transform set for each intra prediction mode in an NSST as an embodiment to which the present disclosure is applied.

FIG. 13 is a calculation flow diagram for Givens rotation as an embodiment to which the present disclosure is applied.

FIG. 14 illustrates one round configuration in 4×4 NSST constituted by a givens rotation layer and permutations as an embodiment to which the present disclosure is applied.

FIG. 15 is a block diagram for describing operations of a forward reduced transform and an inverse reduced transform as an embodiment to which the present disclosure is applied.

FIG. 16 is a diagram illustrating a process of performing an inverse scan from $64^{th}$ to $17^{th}$ according to an inverse scan order as an embodiment to which the present disclosure is applied.

FIG. 17 illustrates a 16×16 orthogonal band matrix which may be used in a preprocessing step and/or a postprocessing step as an embodiment to which the present disclosure is applied.

FIG. 18 illustrates MTS mapping for an intra prediction residual as an embodiment to which the present disclosure is applied.

FIG. 19 illustrates MTS mapping for an inter prediction residual as an embodiment to which the present disclosure is applied.

FIG. 20 is a flowchart of encoding a video signal by using an approximation transform based on a preprocessing/postprocessing matrix as an embodiment to which the present disclosure is applied.

FIG. 21 is a flowchart of decoding a video signal by using an approximation transform based on a preprocessing/postprocessing matrix as an embodiment to which the present disclosure is applied.

FIG. 22 is an architectural diagram of a content streaming system as an embodiment to which the present disclosure is applied.

BEST MODE

The present disclosure provides a method for reconstructing a video signal by using an approximation transform based on a preprocessing/postprocessing matrix, which includes: obtaining a transform index of a current block from a video signal, wherein the transform index corresponds to any one of a plurality of transform combinations including at least one of DST7, DCT8, DST6, or flipped DST7, and a transform combination includes a horizontal transform and a vertical transform; deriving a primary transform for horizontal/vertical directions corresponding to the transform index; performing an inverse primary approximation transform by using the primary transform for the horizontal/vertical directions, wherein the inverse primary approximation transform is generated by multiplying the primary transform for the horizontal/vertical directions by a preprocessing matrix and a postprocessing matrix; and reconstructing the video signal by using the inverse primary approximation-transformed current block.

In the present disclosure, the preprocessing matrix and the postprocessing matrix represent an orthogonal band matrix and the orthogonal band matrix is a matrix in which a specific diagonal region of an N×N matrix has a non-zero value and other regions have a value of 0.

In the present disclosure, in the specific diagonal region, the number of non-zero values for each row or column is 4 or 3.

In the present disclosure, at least one of the preprocessing matrix and the postprocessing matrix is an identity matrix.

In the present disclosure, wherein the transform combination includes at least one of DST7, DCT8, DST6, or flipped DST7, and wherein the inverse primary approximation transform is approximated by using at least one of $(S_N^{II})^T$, $(S_N^{III})^T$, $(C_N^{II})^T$, and $(C_N^{III})^T$.

In the present disclosure, when the current block is an intra-predicted residual, the transform combinations (horizontal transform, vertical transform) include (DST7, DST7), (DCT8, DST7), (DST7, DCT8), and (DCT8, DCT8), and the transform indexes corresponding to the transform combinations are 0, 1, 2, and 3, respectively.

In the present disclosure, when the current block is an inter-predicted residual, the transform combinations (horizontal transform, vertical transform) include (DCT8, DCT8), (DST7, DCT8), (DCT8, DST7), and (DST7, DST7), and the transform indexes corresponding to the transform combinations are 0, 1, 2, and 3, respectively.

The present disclosure provides an apparatus for reconstructing a video signal by using an approximation transform based on a preprocessing/postprocessing matrix, which includes: a parsing unit obtaining a transform index of a current block from a video signal, wherein the transform index corresponds to any one of a plurality of transform combinations including at least one of DST7, DCT8, DST6, or flipped DST7, and the transform combination includes a horizontal transform and a vertical transform; a transform unit deriving a primary transform for horizontal/vertical directions corresponding to the transform index and performing an inverse primary approximation transform by using the primary transform for the horizontal/vertical directions, wherein the inverse primary approximation transform is generated by multiplying the primary transform for the horizontal/vertical directions by a preprocessing matrix and a postprocessing matrix; and a reconstruction unit reconstructing the video signal by using the inverse primary approximation-transformed current block.

MODE FOR INVENTION

Hereinafter, a configuration and operation of an embodiment of the present disclosure will be described in detail with reference to the accompanying drawings, a configuration and operation of the present disclosure described with reference to the drawings are described as an embodiment, and the scope, a core configuration, and operation of the present disclosure are not limited thereto.

Further, terms used in the present disclosure are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present disclosure and a meaning of the corresponding term should be comprehended and construed.

Further, when there is a general term selected for describing the invention or another term having a similar meaning, terms used in the present disclosure may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

In the present disclosure. Multiple Transform Selection (MTS) may refer to a method for performing transform using at least two transform types. This may also be expressed as an Adaptive Multiple Transform (AMT) or Explicit Multiple Transform (EMT), and likewise, mts_idx may also be expressed as AMT_idx, EMT_idx, tu_mts_idx, AMT_TU_idx, EMT_TU_idx, transform index, or transform combination index and the present disclosure is not limited to the expressions.

FIG. 1 is a schematic block diagram of an encoder in which encoding of a video signal is performed as an embodiment to which the present disclosure is applied.

Referring to FIG. 1, the encoder 100 may be configured to include an image division unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185, and an entropy encoding unit 190.

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU).

However, the terms are only used for the convenience of description of the present disclosure and the present disclosure is not limited to the definition of the terms. In addition, in the present disclosure, for the convenience of the description, the term coding unit is used as a unit used in encoding or decoding a video signal, but the present disclosure is not limited thereto and may be appropriately interpreted according to the present disclosure.

The encoder 100 subtracts a prediction signal (or a prediction block) output from the inter-prediction unit 180 or the intra-prediction unit 185 from the input image signal to generate a residual signal (or a residual block) and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as multiple transform selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

The plurality of transforms (or transform combinations) may include the transforms (or transform combinations) described in FIG. 6 of the present disclosure. In the present disclosure, the transform or transform type may be expressed as, for example, DCT-Type 2, DCT-II, DCT-2, or DCT2.

The transform unit 120 may perform the following embodiments.

The present disclosure provides a method for approximating a specific cosine transform or a specific sine transform by adding a preprocessing step and a postprocessing step to a cosine transform or a sine transform.

In the present disclosure, the transform unit 120 may perform a forward primary approximation transform in a horizontal/vertical direction for a current block by using an optimal horizontal/vertical primary transform.

Here, the forward primary approximation transform represents a transform generated by multiplying the optimal horizontal primary transform or the optimal vertical primary transform by the preprocessing matrix and the postprocessing matrix. For example, the forward primary approximation transform may be generated by Equation 18 to be described below.

As an embodiment, at least one of the preprocessing matrix and the postprocessing matrix may be an identity matrix.

As an embodiment, the preprocessing matrix and the postprocessing matrix may be orthogonal band matrices. Here, the orthogonal band matrix represents a matrix in which a specific diagonal region of an N×N matrix has a non-zero value and other regions are filled with a value of 0. For example, in the specific diagonal region, the number of non-zero values for each row or column may be 4 or 3.

As an embodiment, when an MTS transform combination is configured by using at least one of DST7, DCT8, DST6, or flipped DST7, a forward transform and an inverse transform of DST7, DCT8, DST6, or flipped DST7 may be approximated by using at least one of $(S_N^{II})^T$, $(S_N^{III})^T$, $(C_N^{II})^T$, and $(C_N^{III})^T$. That is, the preprocessing matrix and the postprocessing matrix of other transform may be derived by using one preprocessing matrix and one postprocessing matrix.

Detailed embodiments thereof will be described in more detail in the present disclosure.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bitstream.

Although the transform unit 120 and the quantization unit 130 are described as separate functional units, the present disclosure is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. Here, since the reference picture used for prediction is a transformed signal that is quantized and dequantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. Here, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

FIG. 2 is a schematic block diagram of a decoder in which decoding of a video signal is performed as an embodiment to which the present disclosure is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder 200 may be reproduced through a reproduction device.

The decoder 200 may receive the signal output from the encoder 100 of FIG. 1 and the received signal may be entropy-decoded through the entropy decoding unit 210.

The dequantization unit 220 obtains the transform coefficient from an entropy-decoded signal by using quantization step size information.

The inverse transform unit 230 inversely transforms the transform coefficient to obtain the residual signal.

Here, the present disclosure provides a method for configuring a transform combination for each transform configuration group divided by at least one of a prediction mode, a block size or a block shape and the inverse transform unit 230 may perform inverse transform based on the transform combination configured by the present disclosure. Further, the embodiments described in the present disclosure may be applied.

The inverse transform unit 230 may perform the following embodiments.

In the present disclosure, the inverse transform unit 230 may perform an inverse primary approximation transform for the horizontal/vertical direction by using a horizontal/vertical primary transform.

Here, the inverse primary approximation transform represents a transform generated by multiplying the horizontal primary transform or the vertical primary transform by the preprocessing matrix and the postprocessing matrix.

For example, the inverse primary approximation transform may be generated by Equation 18 to be described below.

As an embodiment, at least one of the preprocessing matrix and the postprocessing matrix may be an identity matrix.

As an embodiment, the preprocessing matrix and the postprocessing matrix may be orthogonal band matrices. Here, the orthogonal band matrix represents a matrix in which a specific diagonal region of an N×N matrix has a non-zero value and other regions are filled with a value of 0. For example, in the specific diagonal region, the number of non-zero values for each row or column may be 4 or 3.

As an embodiment, when an MTS transform combination is configured by using at least one of DST7, DCT8, DST6, or flipped DST7, a forward transform and an inverse transform of DST7, DCT8, DST6, or flipped DST7 may be approximated by using at least one of $(S_N^{II})^T$, $(S_N^{III})^T$, $(C_N^{II})^T$, and $(C_N^{III})^T$. That is, the preprocessing matrix and the postprocessing matrix of other transform may be derived by using one preprocessing matrix and one postprocessing matrix.

Although the dequantization unit 220 and the inverse transform unit 230 are described as separate functional units, the present disclosure is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In the present disclosure, the embodiments described in the transform unit 120 and the respective functional units of the encoder 100 may be equally applied to the inverse transform unit 230 and the corresponding functional units of the decoder, respectively.

FIG. 3 illustrates embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (1/2N×2N, N×2N, 1/2N×2N). The AT may have four types of splits of a horizontal-up AT (2N×1/2N, 2N×3/2N), a horizontal-down AT (2N×3/2N, 2N×1/2N), a vertical-left AT (1/2N×2N, 3/2N×2N), and a vertical-right AT (3/2N×2N, 1/2N×2N). Each BT, TT, or AT may be further split recursively using the BT, TT, or AT.

FIG. 3A shows an example of a QT split. A block A may be split into four subblocks A0, A1, A2, and A3 by a QT. The subblock A1 may be split into four subblocks B0, B1, B2, and B3 by a QT.

FIG. 3B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

FIGS. 4 and 5 are embodiments to which the disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT2") may be applied to the primary transform.

Alternatively, a discrete sine transform-type 7 (hereinafter called "DST7") may be applied to a specific case. For example, in the intra prediction mode, the DST7 may be applied to a 4×4 block.

Further, the primary transform may adopt combinations of various transforms DST 7, DCT 8, DST 1, and DCT 5 of the multiple transform selection (MTS). For example, FIG. 6 may be adopted.

The secondary transform unit 122 may apply the secondary transform to a primary transformed signal and here, the secondary transform may be predefined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

As another embodiment, the secondary transform may adopt combinations of various transforms DST 7, DCT 8, DST 1, and DCT 5 of the multiple transform selection (MTS). For example, FIG. 6 may be adopted.

As another embodiment, the DST 7 may be applied to a primary transform.

As another embodiment, the DST 8 may be applied to the primary transform.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

The NSST, the 4×4 NSST, and the 8×8 NSST will be described in more detail with reference to FIGS. 12 to 15 and other embodiments in the present disclosure.

The quantization unit 130 may perform quantization for the secondary transformed signal.

The dequantization and inverse transform units 140 and 150 perform the above-described process in reverse, and a redundant description thereof will be omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. Here, the inverse secondary transform represents an inverse transform of the secondary transform described in FIG. 4 above.

As another embodiment, the secondary transform may adopt combinations of various transforms DST 7, DCT 8, DST 1, and DCT 5 of the multiple transform selection (MTS). For example, FIG. 6 may be adopted.

The inverse primary transform unit 232 performs an inverse primary transform for the inverse secondary transformed signal (or block) and obtains the residual signal. Here, the inverse primary transform represents the inverse transform of the primary transform described in FIG. 4 above.

As an embodiment, the primary transform may adopt combinations of various transforms DST 7, DCT 8, DST 1, and DCT 5 of the multiple transform selection (MTS). For example, FIG. 6 may be adopted.

As an embodiment of the present disclosure, the DST 7 may be applied to the primary transform.

As an embodiment of the present disclosure, the DCT 8 may be applied to the primary transform.

The present disclosure may provide a method for configuring a transform combination for each transform configuration group divided by at least one of a prediction mode, a block size or a block shape and the inverse primary transform unit 232 may perform the inverse transform based on the transform combination configured by the present disclosure. Further, the embodiments described in the present disclosure may be applied.

FIG. 6 is a table showing a transform configuration group to which Multiple Transform Selection (MTS) is applied as an embodiment to which the present disclosure is applied.

Transform configuration group to which Multiple Transform Selection (MTS) is applied In the present disclosure, a j-th transform combination candidate for transform configuration group $G_i$ is represented by a pair shown in Equation 1 below.

$$(H(G_i,j), V(G_i,j))$$ [Equation 1]

Here, $H(G_i, j)$ indicates the horizontal transform for the j-th candidate, and $V(G_i, j)$ indicates the vertical transform for the j-th candidate. For example, in FIG. 6, $H(G_3, 2)$=DST 7, $V(G_3, 2)$=DCT 8 may be represented. Depending on a context, a value assigned to $H(G_i, j)$ or $V(G_i, j)$ may be a nominal value to distinguish transformations, as in the example above or may be an index value indicating the transform or may be a 2 dimensional (D) matrix for the transform.

Further, in the present disclosure, a 2D matrix value for DCT and DST may be represented as shown in Equation 2 and 3 below.

DCT type 2: $C_N^{II}$, DCT type 8: $C_N^{VIII}$ [Equation 2]

DST type 7: $S_N^{VII}$, DST type 4: $S_N^{IV}$ [Equation 3]

Here, whether the transform is DST or DCT is represented by S or C, a type number is represented as a superposition in the form of a Roman number, and N of a lower subscript indicates that the transform is an N×N transform. Further, in the 2D matrix such as the $C_N^{II}$ and $S_N^{IV}$, it is assumed that column vectors form a transform basis.

Referring to FIG. 6 above, the transform configuration groups may be determined based on the prediction mode and the number of groups may be a total of six groups G0 to G5. In addition, G0 to G4 correspond to a case where intra prediction is applied, and G5 represents transform combinations (or transform sets and transform combination sets) applied to the residual block generated by the inter prediction.

One transform combination may include a horizontal transform (or row transform) applied to rows of a corresponding 2D block and a vertical transform (or column transform) applied to columns.

Here, each of all of the transform configuration groups may have four transform combination candidates. The four transform combinations may be selected or determined through transform combination indexes of 0 to 3 and the transform combination index may be encoded and transmitted from the encoder to the decoder.

As an embodiment, the residual data (or residual signal) obtained through the intra prediction may have different statistical characteristics according to the intra prediction mode. Therefore, as illustrated in FIG. 6 above, transforms other than a general cosine transform may be applied to each intra prediction mode.

Referring to FIG. 6 above, a case of using 35 intra prediction modes and a case of using 67 intra prediction modes are illustrated. A plurality of transform combinations may be applied to each transform configuration group divided in each intra prediction mode column. For example, the plurality of transform combinations may include four (row direction transforms and column direction transforms) combinations. As a specific example, DST-7 and DST-5 may be applied in a row (horizontal) direction and a column (vertical) direction in group 0, and as a result, a total of four combinations are available.

Since a total of four transform kernel combinations may be applied to each intra prediction mode, a transform combination index for selecting one of the transform kernel combinations may be transmitted every transform unit. In the present disclosure, the transform combination index may be called MTS index and expressed as mts_idx.

Further, in addition to the transform kernels presented in FIG. 6 above, a case where DCT2 is optimal for both the row direction and the column direction due to characteristics of the residual signal may occur. Accordingly, the MTS flag is defined for each coding unit to adaptively perform the transform. Here, when the MTS flag is 0, DCT2 may be applied to both the row direction and the column direction and when the MTS flag is 1, one of four combinations may be selected or determined through the MTS index.

As an embodiment, when the MTS flag is 1, if the number of non-zero transform coefficients for one transform unit is not greater than a threshold, the DST-7 may be applied to both the row direction and the column direction without applying the transform kernels of FIG. 6 above. For example, the threshold may be configured to 2, which may be configured differently based on the block size or the size of the transform unit. This is also applicable to other embodiments in the present disclosure.

As an embodiment, if the number of non-zero transform coefficients is not greater than the threshold by first parsing the transform coefficient values, an additional information transmission amount may be reduced by applying the DST-7 without parsing the MTS index.

As an embodiment, when the MTS flag is 1, if the number of non-zero transform coefficients is greater than the threshold for one transform unit, the MTS index may be parsed and the horizontal transform and the vertical transform may be determined based on the MTS index.

As an embodiment, the MTS may be applied only when both a width and a height of the transform unit are equal to or smaller than 32.

As an embodiment, FIG. 6 above may be preconfigured through off-line training.

As an embodiment, the MTS index may be defined as one index which may simultaneously indicate the horizontal transform and the vertical transform. Alternatively, the MTS index may separately define a horizontal transform index and a vertical transform index.

As an embodiment, the MTS flag or the MTS index may be defined in at least one level of a sequence, a picture, a slice, a block, a coding unit, a transform unit, or a prediction unit. For example, the MTS flag or the MTS index may be defined in at least one level of a sequence parameter set (SPS), the coding unit, or the transform unit.

FIG. 7 is a flowchart showing an encoding process in which Multiple Transform Selection (MTS) is performed as an embodiment to which the present disclosure is applied.

In the present disclosure, an embodiment in which transforms are a separately applied to the horizontal direction and the vertical direction is basically described, but the transform combination may be constituted even by non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 6 above may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform configuration group corresponding to the current block (S710). Here, the transform configuration group may mean the transform configuration group of FIG. 6 above and the present disclosure is not limited thereto and the transform configuration group may include other transform combinations.

The encoder may perform a transform for candidate transform combinations available in the transform configuration group (S720).

As a result of performing the transform, the encoder may determine or select a transform combination having a smallest rate distortion (RD) cost (S730).

The encoder may encode the transform combination index corresponding to the selected transform combination (S740).

FIG. 8 is a flowchart showing a decoding process in which Multiple Transform Selection (MTS) is performed as an embodiment to which the present disclosure is applied.

First, the decoder may determine the transform configuration group for the current block (S810).

The decoder may parse (or obtain) the transform combination index from the video signal and here, the transform combination index may correspond to any one of the plurality of transform combinations in the transform configuration group (S820). For example, the transform configuration group may include Discrete Sine Transform type (DST) 7 and Discrete Cosine Transform type (DST) 8. The transform combination index may be referred to as the MTS index.

As an embodiment, the transform configuration group may be configured based on at least one of the prediction mode, the block size, or the block shape of the current block.

The decoder may derive the transform combination corresponding to the transform combination index (S830). Here, the transform combination may include the horizontal transform and the vertical transform, and may include at least one of the DST-7 or the DCT-8.

Further, the transform combination may mean the transform combination described in FIG. 6 above, but the present disclosure is not limited thereto. That is, the transform combination may be configured by other transform combinations depending on other embodiments in the present disclosure.

The decoder may perform the inverse transform for the current block based on the transform combination (S840). When the transform combination includes the row (horizontal) transform and the column (vertical) transform, the column (vertical) transform may be applied after applying the row (horizontal) transform first. However, the present disclosure is not limited thereto and the transform order may be reversed or when the transform combination includes the non-separable transforms, the non-separable transform may be immediately applied.

As an embodiment, when the vertical transform or the horizontal transform is the DST-7 or the DCT-8, the inverse transform of the DST-7 or the inverse transform of the DCT-8 may be applied to each column and then applied to each row.

As an embodiment, in respect to the vertical transform or the horizontal transform, different transform may be applied to each row and/or to each column.

As an embodiment, the transform combination index may be obtained based on the MTS flag indicating whether the MTS is performed. That is, the transform combination index may be obtained when the MTS is performed according to the MTS flag.

As an embodiment, the decoder may check whether the number of non-zero transform coefficients is greater than the threshold. In this case, the transform combination index may be obtained when the number of non-zero transform coefficients is greater than the threshold.

As an embodiment, the MTS flag or the MTS index may be defined in at least one level of a sequence, a picture, a slice, a block, a coding unit, a transform unit, or a prediction unit.

As an embodiment, the inverse transform may be applied only when both the width and the height of the transform unit are equal to or smaller than 32.

On the other hand, as another embodiment, a process of determining the transform configuration group and a process of parsing the transform combination index may be performed at the same time. Alternatively, step S810 above may be preconfigured and omitted in the encoder and/or the decoder.

FIG. 9 is a flowchart for describing a process of encoding an MTS flag and an MTS index as an embodiment to which the present disclosure is applied.

The encoder may determine whether the Multiple Transform Selection (MTS) is applied to the current block (S910).

When the Multiple Transform Selection (MTS) is applied, the encoder may encode MTS flag=1 (S920).

In addition, the encoder may determine the MTS index based on at least one of the prediction mode, the horizontal transform, and the vertical transform of the current block (S930). Here, the MTS index may mean an index indicating any one of the plurality of transform combinations for each intra prediction mode and the MTS index may be transmitted for each transform unit.

When the MTS index is determined, the encoder may encode the MTS index (S940).

On the other hand, when the Multiple Transform Selection (MTS) is not applied, the encoder may encode MTS flag=0 (S950).

FIG. 10 is a flowchart for describing a decoding process in which a horizontal transform or vertical transform is applied to a row or a column based on an MTS flag and an MTS index as an embodiment to which the present disclosure is applied.

The decoder may parse the MTS flag from the bitstream (S1010). Here, the MTS flag may indicate whether the Multiple Transform Selection (MTS) is applied to the current block.

The decoder may determine whether the Multiple Transform Selection (MTS) is applied to the current block based on the MTS flag (S1020). For example, it may be checked whether the MTS flag is 1.

When the MTS flag is 1, the decoder may check whether the number of non-zero transform coefficients is greater than (or equal to or greater than) the threshold (S1030). For example, the threshold may be configured to 2, which may be configured differently based on the block size or the size of the transform unit.

When the number of non-zero transform coefficients is greater than the threshold, the decoder may parse the MTS index (S1040). Here, the MTS index may mean any one of the plurality of transform combinations for each intra prediction mode or inter prediction mode and the MTS index may be transmitted for each transform unit. Alternatively, the MTS index may mean an index indicating any one transform combination defined in a preconfigured transform combination table and here, the preconfigured transform combination table may mean FIG. 6 above, but the present disclosure is limited thereto.

The decoder may derive or determine the horizontal transform and the vertical transform based on at least one of the MTS index and the prediction mode (S1050).

Alternatively, the decoder may derive the transform combination corresponding to the MTS index. For example, the decoder may derive or determine the horizontal transform and the vertical transform corresponding to the MTS index.

Meanwhile, when the number of non-zero transform coefficients is not greater than the threshold, the decoder may apply a preconfigured vertical inverse transform for each column (S1060). For example, the vertical inverse transform may be the inverse transform of the DST7.

In addition, the decoder may apply a preconfigured horizontal inverse transform for each row (S1070). For example, the horizontal inverse transform may be the inverse transform of the DST7. That is, when the number of non-zero transform coefficients is not greater than the threshold, a transform kernel preconfigured by the encoder or decoder may be used. For example, the transform kernel that is not defined in the transform combination table illustrated in FIG. 6 above, but is widely used may be used.

Meanwhile, when the MTS flag is 0, the decoder may apply the preconfigured vertical inverse transform for each column (S1080). For example, the vertical inverse transform may be the inverse transform of the DCT2.

In addition, the decoder may apply the preconfigured horizontal inverse transform for each row (S1090). For example, the horizontal inverse transform may be the inverse transform of the DCT2. That is, when the MTS flag is 0, the transform kernel preconfigured in the encoder or decoder may be used. For example, the transform kernel that is not defined in the transform combination table illustrated in FIG. 6 above, but is widely used may be used.

FIG. 11 is a flowchart of performing an inverse transform based on a transform related parameter as an embodiment to which the present disclosure is applied.

The decoder to which the present disclosure is applied may obtain sps_mts_intra_enabled_flag or sps_mts_inter_enabled_flag (S1110). Here, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=0, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the inter coding unit and when sps_mts_inter_enabled_flag=0, tu_mts_flag exists in the residual coding syntax of the inter coding unit.

The decoder may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may obtain tu_mts_flag. Here, tu_mts_flag indicates whether multiple transform selection (hereinafter, referred to as "MTS") is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present disclosure may be applied to the tu_mts_flag.

The decoder may obtain mts_idx based on tu_mts_flag (S1130). For example, when tu_mts_flag=1, the decoder may obtain mts_idx. Here, mts_idx indicates which transform kernel is applied to luma residual samples along the horizontal and/or vertical direction of a current transform block.

For example, at least one of the embodiments of the present disclosure may be applied to mts_idx. As a specific example, at least one of the embodiments of FIG. 6 above may be applied.

The decoder may derive the transform kernel corresponding to mts_idx (S1140). For example, the transform kernel corresponding to the mts_idx may be defined by being divided into the horizontal transform and the vertical transform.

As another example, different transform kernels may be applied to the horizontal transform and the vertical transform. However, the present disclosure is not limited thereto, and the same transform kernel may be applied to the horizontal transform and the vertical transform.

As an embodiment, mts_idx may be defined as shown in Table 1 below.

TABLE 1

| mts_idx[x0][y0] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

In addition, the decoder may perform the inverse transform based on the transform kernel (S1150).

As another embodiment of the present disclosure, a decoding process of performing the transform process is described.

The decoder may check a transform size nTbS (S10). Here, the transform size nTbS may be a variable representing horizontal sample sizes of scaled transform coefficients.

The decoder may check a transform kernel type trType (S20). Here, the transform kernel type trType may be a variable representing the type of transform kernel and various embodiments of the present disclosure may be applied. The transform kernel type trType may include a horizontal transform kernel type trTypeHor and a vertical transform kernel type trTypeVer.

Referring to Table 1 above, when the transform kernel type trType is 0, the transform kernel type may represent DCT2, when the transform kernel type trType is 1, the transform kernel type may represent DST7, and when the transform kernel type trType is 2, the transform kernel type may represent DCT8.

The decoder may perform a transform matrix product based on at least one of the transform size nTbS or the transform kernel type (S30).

As another example, when the transform kernel type is 1 and the transform size is 4, a predetermined transform matrix 1 may be applied when performing the transform matrix product.

As another example, when the transform kernel type is 1 and the transform size is 8, a predetermined transform matrix 2 may be applied when performing the transform matrix multiplication.

As another example, when the transform kernel type is 1 and the transform size is 16, a predetermined transform matrix 3 may be applied when performing the transform matrix product.

As another example, when the transform kernel type is 1 and the transform size is 32, a predefined transform matrix 4 may be applied.

Similarly, when the transform kernel type is 2 and the transform size is 4, 8, 16, or 32, predefined transform matrices 5, 6, 7, and 8 may be applied, respectively.

Here, each of the predefined transform matrices 1 to 8 may correspond to any one of various types of transform matrices. As an example, the transform matrix of the type illustrated in FIG. 6 above may be applied.

The decoder may derive a transform sample based on the transform matrix product (S40).

Each of the above embodiments may be used, but the present disclosure is not limited thereto, and may be used in combination with the above embodiments and other embodiments of the present disclosure.

FIG. 12 is a table showing allocation of a transform set for each intra prediction mode in an NSST as an embodiment to which the present disclosure is applied.

Non-Separable Secondary Transform (NSST)

The secondary transform unit may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode may have a different transform set and the corresponding transform set may include two transforms. In respect to the remaining directional modes, each transform set may include three transforms. However, the present disclosure is not limited thereto, and each transform set may include a plurality of transforms.

FIG. 13 is a calculation flow diagram for Givens rotation as an embodiment to which the present disclosure is applied.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 4 below and a matrix product is shown in Equation 5 below.

$$R_\theta = \begin{bmatrix} \cos\theta & -\sin\theta \\ \sin\theta & \cos\theta \end{bmatrix} \quad \text{[Equation 4]}$$

-continued $$l_m = x_m\cos\theta - x_n\sin\theta$$
$$l_n = x_m\sin\theta + x_n\cos\theta$$

[Equation 5]

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

FIG. 15 is a block diagram for describing operations of a forward reduced transform and an inverse reduced transform as an embodiment to which the present disclosure is applied.

Reduced Secondary Transform (RST)

When it is assumed that an orthogonal matrix representing one transform has an N×N form, a reduced transform (hereinafter, referred to as 'RT') leaves only R transform basis vectors among N transform basis vectors (R<N). A matrix for forward RT generating the transform coefficients is given by Equation 6 below.

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

[Equation 6]

Since a matrix for an inverse RT becomes a transpose matrix of the forward RT matrix, the application of the forward RT and the inverse RT is illustrated as in FIG. 15 above.

When a case of applying the RT to the top-left 8×8 block of the transform block which goes through the primary transform is assumed, the RT may be referred to as an 8×8 reduced secondary transform (8×8 RST).

When the R value of Equation 6 above is 16, the forward 8×8 RST has a 16×64 matrix form and the inverse 8×8 RST has a 64×16 matrix form.

Further, the transform set configuration which is the same as that illustrated in FIG. 12 above may be applied even to the 8×8 RST. That is, a corresponding 8×8 RST may be applied according to the transform set in FIG. 12 above.

As an embodiment, when one transform set includes two or three transforms according to the intra prediction mode in FIG. 12 above, one of a maximum of 4 transforms including a case of not applying the secondary transform may be configured to be selected. Here, one transform may be regarded as an identity matrix.

When indexes of 0, 1, 2, and 3 are assigned to the four transforms, respectively, a syntax element called an NSST index may be signaled for each transform block, thereby designating a corresponding transform. That is, in the case of the NSST, the 8×8 NSST may be designated for the 8×8 top-left block through the NSST index and the 8×8 RST may be designated in an RST configuration. Further, in this case, index 0 may be allocated to a case where the identity matrix, i.e., the secondary transform is not applied.

When the forward 8×8 RST shown in Equation 6 above is applied, 16 valid transform coefficients are generated, and as a result, it may be regarded that 64 input data constituting an 8×8 region are reduced to 16 output data. From the perspective of a two-dimensional region, only a one-quarter area is filled with the valid transform coefficient. Accordingly, a top-left area in FIG. 16 may be filled with 16 output data obtained by applying the forward 8×8 RST.

FIG. 16 is a diagram illustrating a process of performing an inverse scan from $64^{th}$ to $17^{th}$ according to an inverse scan order as an embodiment to which the present disclosure is applied.

FIG. 16 above illustrates scanning from the 17th coefficient to the 64th coefficient when the forward scanning order starts from 1 (in the forward scan order). However, FIG. 16 above illustrates the inverse scan and this illustrates performing the inverse scanning from the 64th coefficient to the 17th coefficient.

Referring to FIG. 16 above, the top-left 4×4 region is a region of interest (ROI) to which the valid transform coefficient is allocated and the remaining region is empty. That is, a value of 0 may be allocated to the remaining region by default.

If there is a valid transform coefficient other than 0 in a region other than the ROI region of FIG. 16 above, this means that the 8×8 RST is not applied, and as a result, in this case, NSST index coding corresponding thereto may be omitted.

Conversely, if there is no non-zero transform coefficient in the region other than the ROI region of FIG. 16 above (if the 8×8 RST is applied, when 0 is allocated to the region other than the ROI), there is a possibility that the 8×8 RST will be applied, and as a result, the NSST index may be coded.

As such, conditional NSST index coding may be performed after the residual coding process because it is necessary to check the existence of the non-zero transform coefficient.

Meanwhile, as another embodiment of the present disclosure, another type of MTS may be configured instead of the MTS transform combination. For example, there may be a case where DST7, DST8, DST1, and DCT5 are used or only DST7 and DST8 are used.

Further, different transform combinations may be used for the horizontal transform and the vertical transform. For example, in respect to all intra prediction modes, as illustrated in FIG. 6, four available combinations are configured only with DST7 and DCT8 to configure the combinations so as to specify a transform combination to be applied through MTS index.

The present disclosure proposes a method for approximating the target cosine target and the target sine transform by using the cosine transform or the sine transform which is easily implemented.

The intra prediction mode may be mapped to all MTS transform combinations including the cosine transform or sine transform which may be approximated through the method. However, this is not limited only to the primary transform and may be applied even to the secondary transform or other transforms.

Further, an embodiment of the present disclosure proposes a method in which the preprocessing matrices and the postprocessing matrices may be derived from each other at the time of approximating multiple transforms. As such, only one preprocessing matrix and one postprocessing matrix are stored to reduce the required memory amount.

Hereinafter, more detailed embodiments will be described.

Embodiment 1: Additional Transform Span Set Configuring Method

An equation for the cosine transform applied in the present disclosure is as shown in Equation 7 below.

$$(C_N^I)_{lk} = \gamma_k \gamma_l \sqrt{\frac{2}{N-1}} \cos\left(kl\frac{\pi}{N-1}\right),$$ [Equation 7]

$k, l = 0, 1, K, N-1$ $$(C_N^{II})_{lk} = \sqrt{\frac{2}{N}} \sigma_k \cos\left[\left(l+\frac{1}{2}\right)\frac{k\pi}{N}\right],$$

$k, l = 0, 1, K, N-1$ $$(C_N^{III})_{lk} = \sqrt{\frac{2}{N}} \sigma_l \cos\left[l\left(k+\frac{1}{2}\right)\frac{\pi}{N}\right],$$

$k, l = 0, 1, K, N-1$ $$(C_N^{IV})_{lk} = \sqrt{\frac{2}{N}} \cos\left[\left(l+\frac{1}{2}\right)\left(k+\frac{1}{2}\right)\frac{\pi}{N}\right],$$

$k, l = 0, 1, K, N-1$ $$(C_N^{V})_{lk} = \frac{2}{\sqrt{2N-1}} \sigma_l \sigma_k \cos\left[kl\left(\frac{2\pi}{2N-1}\right)\right],$$

$k, l = 0, 1, K, N-1$ $$(C_N^{VI})_{lk} = \frac{2}{\sqrt{2N-1}} \sigma_k \varepsilon_l \cos\left[\left(l+\frac{1}{2}\right)k\frac{2\pi}{2N-1}\right],$$

$k, l = 0, 1, K, N-1$ $$(C_N^{VII})_{lk} = \frac{2}{\sqrt{2N-1}} \varepsilon_k \sigma_l \cos\left[l\left(k+\frac{1}{2}\right)\frac{2\pi}{2N-1}\right],$$

$k, l = 0, 1, \ldots, N-1$

-continued $$(C_N^{VIII})_{lk} = \frac{2}{\sqrt{2N+1}} \cos\left[\left(l+\frac{1}{2}\right)\left(k+\frac{1}{2}\right)\frac{2\pi}{2N+1}\right],$$

$k, l = 0, 1, K, N-1$ where $\gamma_l = \frac{1}{\sqrt{2}}$ for $l = 0$ or $N-1$, $\sigma_l = \frac{1}{\sqrt{2}}$ for $l = 0$, and $\varepsilon_l = \frac{1}{\sqrt{2}}$ for $l = N-1$ Here, $\gamma_l$, $\sigma_l$, and $\varepsilon_l$ have a value of 1 in cases other than the values. That is, $\gamma_l$, $\sigma_l$, and $\varepsilon_l$ have the value of 1.

In addition, an equation for the sine transform applied in the present disclosure is as shown in Equation 8 below.

$$(S_N^I)_{lk} = \sqrt{\frac{2}{N-1}} \sin\left[(l+1)(k+1)\frac{\pi}{N+1}\right],$$ [Equation 8]

$k, l = 0, 1, K, N-1$ $$(S_N^{II})_{lk} = \sqrt{\frac{2}{N}} \varepsilon_k \sin\left[\left(l+\frac{1}{2}\right)(k+1)\frac{\pi}{N}\right],$$

$k, l = 0, 1, K, N-1$ $$(S_N^{III})_{lk} = \sqrt{\frac{2}{N}} \varepsilon_l \sin\left[(l+1)\left(k+\frac{1}{2}\right)\frac{\pi}{N}\right],$$

$k, l = 0, 1, K, N-1$ $$(S_N^{IV})_{lk} = \sqrt{\frac{2}{N}} \sin\left[\left(l+\frac{1}{2}\right)\left(k+\frac{1}{2}\right)\frac{\pi}{N}\right],$$

$k, l = 0, 1, K, N-1$ $$(S_N^{V})_{lk} = \frac{2}{\sqrt{2N+1}} \sin\left[(l+1)(k+1)\frac{2\pi}{2N+1}\right],$$

$k, l = 0, 1, K, N-1$ $$(S_N^{VI})_{lk} = \frac{2}{\sqrt{2N+1}} \sin\left[\left(l+\frac{1}{2}\right)(k+1)\frac{2\pi}{2N+1}\right],$$

$k, l = 0, 1, K, N-1$ $$(S_N^{VII})_{lk} = \frac{2}{\sqrt{2N+1}} \sin\left[(l+1)\left(k+\frac{1}{2}\right)\frac{2\pi}{2N+1}\right],$$

$k, l = 0, 1, K, N-1$ $$(S_N^{VIII})_{lk} = \frac{2}{\sqrt{2N-1}} \varepsilon_l \varepsilon_k \sin\left[\left(l+\frac{1}{2}\right)\left(k+\frac{1}{2}\right)\frac{2\pi}{2N+1}\right],$$

$k, l = 0, 1, K, N-1$ where $\varepsilon_l = \frac{1}{\sqrt{2}}$ for $l = N-1$

Here, $\varepsilon_k$, and $\varepsilon_l$ have the value of 1 in cases other than the values. That is, $\varepsilon_k$, and $\varepsilon_l$ have the value of 1.

Equations 9 and 0 below may be derived from Equations 7 and 8 above.

$(C_N^I)^T = C_N^I$ $(C_N^{II})^T = C_N^{III}, (C_N^{III})^T = C_N^{II}$ $(C_N^{IV})^T = C_N^{IV}$ $(C_N^V)^T = C_N^V$ $(C_N^{VI})^T = C_N^{VII}, (C_N^{VII})^T = C_N^{VI}$ $(C_N^{VIII})^T = C_N^{VIII}$ [Equation 9]

$(S_N^I)^T = S_N^I$ $(S_N^{II})^T = S_N^{III}, (S_N^{III})^T = S_N^{II}$ $(S_N^{IV})^T = S_N^{IV}$ $(S_N^V)^T = S_N^V$ $(S_N^{VI})^T = S_N^{VII}, (S_N^{VII})^T = S_N^{VI}$ $(S_N^{VIII})^T = S_N^{VIII}$ [Equation 10]

Since all cosine transforms and sine transforms of Equations 7 and 8 above are orthogonal transforms, even though all cosine transforms and sine transforms are transposed, all cosine transforms and sine transforms are the orthogonal transforms. A transposed matrix may also be one transform and an inverse transform for an original transform. Further, the original transform may be an inverse transform for the transposed matrix.

Accordingly, if the original transform is used while being included in the MTS transform combination, even though the transposed transform is used while being included in the MTS transform combination, adding a separate memory is not required. Further, if the inverse transform of the original transform is already implemented, it is not necessary to design the transform for the transposed matrix.

Meanwhile, In Equation 10, the transposed matrix corresponds to a forward transform and a matrix which is not transposed corresponds to an inverse transform. For example, in the case of DST7, $(S_N^{VIII})^T$ becomes the forward transform and $S_N^{VIII}$ becomes the inverse transform.

From equations for the cosine transforms and the sine transforms, a relationship $C_N^{VIII}$ and $S_N^{VII}$ and a relationship between $C_N^{IV}$ and $S_N^{VI}$ are included to derive relational equations of Equation 11 below.

$C_N^{II} = D_N S_N^{II} J_N (C_N^{II})^T = J_N (S_N^{II})^T D_N$ $C_N^{III} = J_N S_N^{III} D_N (C_N^{III})^T = D_N (S_N^{III})^T J_N$ $C_N^{IV} = J_N S_N^{IV} J_N (C_N^{IV})^T = D_N (S_N^{IV})^T J_N$ $C_N^V = J_N C_N^{VI} D_N (C_N^V)^T = D_N (C_N^{VI})^T J_N$ $C_N^V = D_N C_N^{VII} J_N (C_N^V)^T = J_N (C_N^{VII})^T D_N$ $C_N^{VI} = J_N C_N^V D_N (C_N^{VI})^T = D_N (C_N^V)^T J_N$ $C_N^{VI} = D_N S_N^{VIII} J_N (C_N^{VI})^T = J_N (S_N^{VIII})^T D_N$ $C_N^{VII} = D_N C_N^V J_N (C_N^{VII})^T = J_N (C_N^V)^T D_N$ $C_N^{VII} = J_N S_N^{VIII} D_N (C_N^{VII})^T = D_N (S_N^{VIII})^T J_N$ $C_N^{VIII} = J_N S_N^{VII} D_N (C_N^{VIII})^T = D_N (S_N^{VII})^T J_N$ $C_N^{VIII} = D_N S_N^{VI} J_N (C_N^{VIII})^T = J_N (S_N^{VI})^T D_N$ $S_N^{II} = D_N C_N^{II} J_N (S_N^{II})^T = J_N (C_N^{II})^T D_N$ $S_N^{III} = J_N C_N^{III} D_N (S_N^{III})^T = D_N (C_N^{III})^T J_N$ $S_N^{IV} = J_N C_N^{IV} S_N (S_N^{IV})^T = D_N (C_N^{IV})^T J_N$ $S_N^V = J_N S_N^{VI} D_N (S_N^V)^T = D_N (S_N^{VI})^T J_N$ $S_N^V = D_N S_N^{VII} J_N (S_N^V)^T = J_N (S_N^{VII})^T D_N$ $S_N^{VI} = J_N S_N^V D_N (S_N^{VI})^T = D_N (S_N^V)^T J_N$ $S_N^{VI} = D_N C_N^{VIII} J_N (S_N^{VI})^T = J_N (C_N^{VIII})^T D_N$ $S_N^{VII} = D_N S_N^V J_N (S_N^{VII})^T = J_N (S_N^V)^T D_N$ $S_N^{VII} = J_N C_N^{VIII} D_N (S_N^{VII})^T = D_N (C_N^{VIII})^T J_N$ $S_N^{VIII} = D_N C_N^{VII} J_N (S_N^{VIII})^T = D_N (C_N^{VII})^T J_N$ $S_N^{VIII} = J_N C_N^{VII} D_N (S_N^{VIII})^T = D_N (C_N^{VII})^T J_N$ [Equation 11]

Further, the relational equations shown in Equation 12 below may be derived from the relational equations in Equation 11 above.

$C_N^V = J_N D_N S_N^{VIII} J_N D_N (C_N^V)^T = D_N J_N (S_N^{VIII})^T D_N J_N$ $C_N^{VI} = J_N D_N C_N^{VII} J_N D_N (C_N^{VI})^T = D_N J_N (S_N^{VII})^T D_N J_N$ $C_N^{VII} = D_N J_N C_N^{VI} J_N D_N (C_N^{VII})^T = J_N D_N (C_N^{VI})^T J_N D_N$ $C_N^{VIII} = D_N J_N S_N^V D_N J_N (C_N^{VIII})^T = J_N D_N (S_N^V)^T J_N D_N$ $S_N^V = J_N D_N C_N^{VIII} J_N D_N (S_N^V)^T = D_N J_N (C_N^{VIII})^T D_N J_N$ $S_N^{VI} = J_N D_N S_N^{VII} J_N D_N (S_N^{VI})^T = D_N J_N (S_N^{VII})^T D_N J_N$ $S_N^{VII} = D_N J_N S_N^{VI} D_N J_N (S_N^{VII})^T = J_N D_N (S_N^{VI})^T J_N D_N$ $S_N^{VIII} = D_N J_N C_N^V D_N J_N (S_N^{VIII})^T = J_N D_N (C_N^V)^T J_N D_N$ [Equation 12]

A calculation for $D_N J_N$ and $J_N D_N$ which appear in Equation 12 above may be performed by appropriately combining a sequence inversion and a symbol inversion for an input as shown in Equation 13 below.

$D_N J_N x = [(-1)^0 x_{N-1} (-1)^1 x_{N-2} \ldots (-1)^{N-1} x_0]^T$ $J_N D_N x = [(-1)^{N-1} x_{N-1} (-1)^{N-2} x_{N-2} \ldots (-1)^0 x_0]^T$ [Equation 13]

Accordingly, other multiple transforms may be derived even with kernel coefficient data for one specific transform from the relational equations in Equations 11 and 12 above. In Equation 14 below, transforms which may be spanned by one transform are expressed as a set.

$\text{Span}(C^I) = \{C^I\}$ $\text{Span}(C^{II}) = \{C^{II}, S^{II}\}$ $\text{Span}(C^{III}) = \{C^{III}, S^{III}\}$ $\text{Span}(C^{IV}) = \{C^{IV}, S^{IV}\}$ $\text{Span}(C^V) = \{C^V, C^{VI}, C^{VII}, S^{VIII}\}$ $\text{Span}(C^{VI}) = \{C^V, C^{VI}, C^{VII}, S^{VIII}\}$ $\text{Span}(C^{VII}) = \{C^V, C^{VI}, C^{VII}, S^{VIII}\}$ $\text{span}(C^{VIII}) = \{C^{VIII}, S^V, S^{VI}, S^{VII}\}$ $\text{Span}(S^I) = \{S^I\}$ $\text{Span}(S^{II}) = \{C^{II}, S^{II}\}$ $\text{Span}(S^{III}) = \{C^{III}, S^{III}\}$ $\text{Span}(S^{IV}) = \{C^{IV}, S^{IV}\}$ $\text{Span}(S^V) = \{C^{VIII}, S^V, S^{VI}, S^{VII}\}$ $$\text{Span}(S^{VI}) = \{C^{VIII}, S^V, S^{VI}, S^{VII}\}$$

$$\text{Span}(S^{VII}) = \{C^{VIII}, S^V, S^{VI}, S^{VII}\}$$

$$\text{Span}(S^{VIII}) = \{C^{VIII}, S^V, S^{VI}, S^{VII}\} \quad \text{[Equation 14]}$$

A corresponding span set may be calculated for each span set presented in Equation 14 above. For example, span set P(Span($C^V$)) for Span($C^V$) may be shown in Equation 15 below.

$$P(\text{Span}(C^V)) = \{\phi, \{C^V\}, \{C^{VI}\}, \{C^{VII}\}, \{S^{VIII}\}, \{C^V, C^{VI}\}, \{C^V, C^{VII}\}, \{C^V, S^{VIII}\}, \{C^{VI}, C^{VII}\}, \{C^{VI}, S^{VIII}\}, \{C^V, C^{VI}, C^{VII}\}, \{C^V, C^{VI}, S^{VIII}\}, \{C^V, C^{VII}, S^{VIII}\}, \{C^{VI}, C^{VII}, S^{VIII}\}, \{C^V, C^{VI}, C^{VII}, S^{VIII}\}\} \quad \text{[Equation 15]}$$

When one element of a span set for span set called A is expressed e(A)∈P(Span(A)), as one element may be expressed as shown in Equation 16 below.

$$\Gamma = \bigcup_{i=1}^{VIII} e(C^i) \cup \bigcup_{j=1}^{VIII} e(S^j), \Gamma \neq \phi \quad \text{[Equation 16]}$$

When the transposed transform for each transform may be included in a set which may be spanned, a set which may be spanned as shown in Equation 17 below may be expanded by Equations 9 and 10 above.

$$\text{Span}(C^I) = \{C^I, (C^I)^T\} = \{C^I\}$$

$$\text{Span}(C^{II}) = \{C^{II}, (C^{II})^T, S^{II}, (S^{II})^T\} = \{C^{II}, C^{III}, S^{II}, S^{III}\}$$

$$\text{Span}(C^{III}) = \{C^{III}, (C^{III})^T, S^{III}, (S^{III})^T\} = \{C^{II}, C^{III}, S^{II}, S^{III}\}$$

$$\text{Span}(C^{IV}) = \{C^{IV}, (C^{IV})^T, S^{IV}, (S^{IV})^T\} = \{C^{IV}, S^{IV}\}$$

$$\text{Span}(C^V) = \{C^V, (C^V)^T, C^{VI}, (C^{VI})^T, C^{VII}, (C^{VII})^T, S^{VIII}, (S^{VIII})^T\}\{C^V, C^{VI}, C^{VII}, S^{VIII}\}$$

$$\text{Span}(C^{VI}) = \{C^V, (C^V)^T, C^{VI}, (C^{VI})^T, C^{VII}, (C^{VII})^T, S^{VIII}, (S^{VIII})^T\}\{C^V, C^{VI}, C^{VII}, S^{VIII}\}$$

$$\text{Span}(C^{VII}) = \{C^V, (C^V)^T, C^{VI}, (C^{VI})^T, C^{VII}, (C^{VII})^T, S^{VIII}, (S^{VIII})^T\}\{C^V, C^{VI}, C^{VII}, S^{VIII}\}$$

$$\text{Span}(C^{VIII}) = \{C^{VIII}, (C^{VIII})^T, S^V, (S^V)^T, S^{VI}, (S^{VI})^T, S^{VII}, (S^{VII})^T\}\{C^{VIII}, S^V, S^{VI}, S^{VII}\}$$

$$\text{Span}(S^I) = \{S^I, (S^I)^T\} = \{S^I\}$$

$$\text{Span}(S^{II}) = \{C^{II}, (C^{II})^T, S^{II}, (S^{II})^T\} = \{C^{II}, C^{III}, S^{II}, S^{III}\}$$

$$\text{Span}(S^{III}) = \{C^{III}, (C^{III})^T, S^{III}, (S^{III})^T\} = \{C^{II}, C^{III}, S^{II}, S^{III}\}$$

$$\text{Span}(S^{IV}) = \{C^{IV}, (C^{IV})^T, S^{IV}, (S^{IV})^T\} = \{C^{IV}, S^{IV}\}$$

$$\text{Span}(S^V) = \{C^{VIII}, (C^{VIII})^T, S^V, (S^V)^T, S^{VI}, (S^{VI})^T, S^{VII}, (S^{VII})^T\}\{C^{VIII}, S^V, S^{VI}, S^{VII}\}$$

$$\text{Span}(S^{VI}) = \{C^{VIII}, (C^{VIII})^T, S^V, (S^V)^T, S^{VI}, (S^{VI})^T, S^{VII}, (S^{VII})^T\}\{C^{VIII}, S^V, S^{VI}, S^{VII}\}$$

$$\text{Span}(S^{VII}) = \{C^{VIII}, (C^{VIII})^T, S^V, (S^V)^T, S^{VI}, (S^{VI})^T, S^{VII}, (S^{VII})^T\}\{C^{VIII}, S^V, S^{VI}, S^{VII}\}$$

$$\text{Span}(S^{VIII}) = \{C^V, (C^V)^T, C^{VI}, (C^{VI})^T, C^{VII}, (C^{VII})^T, S^{VIII}, (S^{VIII})^T\}\{C^V, C^{VI}, C^{VII}, S^{VIII}\} \quad \text{[Equation 17]}$$

When compared with Equation 14 above, Equation 17 above is the same as Equation 14 above except for Span ($C^{II}$), Span($C^{III}$), Span($S^{II}$), and Span($S^{III}$). Accordingly, for Span($C^{II}$), Span($C^{III}$), Span($S^{II}$), and Span($S^{III}$), the corresponding span set P(Span($C^{II}$)), P(Span($C^{III}$)), P(Span($S^{II}$)), and P(Span($S^{III}$)) vary.

Γ may be newly configured through Equation 16 above by using the changed span sets and the remaining unchanged span sets. However, it can be seen that since a union of the existing Span($C^{II}$) and the existing Span($C^{III}$) is new Span ($C^{II}$) or new Span($C^{III}$), a set of available Γs is not changed as compared with Equation 16 above.

Contents updated through Equation 17 above are applied to Table 2 below to update a maximally spanned set from seed. That is, Table 2 below may be updated. For example, when $\{C^{II}$ or $S^{II}\}$ is applied to seed, $\{C^{II}, C^{III}, S^{II}, S^{III}\}$ may be obtained by the maximally spanned set.

TABLE 2

| Seed | Maximally spanned set composed of trigonometric transforms |
|---|---|
| $\{C^{II}$ or $S^{II}\}$ | $\{C^{II}$ or $S^{II}\}$ |
| $\{C^{VIII}$ or $S^{VII}\}$ | $\{C^{VIII}$ or $S^{VII}\}$ |
| $\{C^{IV}$ or $S^{IV}\}$ | $\{C^{IV}$ or $S^{IV}\}$ |
| $\{C^{II}$ or $S^{II}$, $C^{VIII}$ or $S^V$ or $S^{VI}$ or $S^{VII}\}$ | $\{C^{II}, C^{VIII}, S^{II}, S^V, S^{VI}, S^{VII}\}$ |
| $\{C^{II}$ or $S^{II}$, $C^{IV}$ or $S^{IV}\}$ | $\{C^{II}$ or $S^{II}$, $C^{IV}$ or $S^{IV}\}$ |

FIG. 17 illustrates a 16×16 orthogonal band matrix which may be used in a preprocessing step and/or a postprocessing step as an embodiment to which the present disclosure is applied.

Embodiment 2: Method for Generating New Transform by Adding Preprocessing Step and Postprocessing Step to Trigonometric Transform In the present disclosure, as shown in Equation 18 below, a new transform R may be generated by multiplying a specific cosine transform C or sine transform S by a preprocessing matrix P and a postprocessing matrix Q. P and Q may be orthogonal transforms so that the new transform R becomes the orthogonal transform.

$$R^T = QC^T P \text{ or } QS^T P \quad \text{[Equation 18]}$$

In Equation 18 above, each of C and S represents the inverse transform and a column vector represents a transform basis vector. Similarly, R also represents the inverse transform and $R^T$ represents the forward transform.

Accordingly, when an output vector y is obtained by applying $R^T$ to an input vector x, a relational equation of $y = R^T x$ is satisfied and in a codec system, y represents coefficient data (or vector).

As an embodiment, C or S of Equation 18 above may become DCT-type 1 to DCT-type 8 (($C_N^I$) to ($C_N^{VIII}$) or DST-type 1 to DST-type 8 (($S_N^I$) to ($S_N^{VIII}$)) of Equations 7 and 8 above. Each of P and Q in Equation 18 above may be the identity matrix. In a case where P or Q is the identity matrix, the case means that the preprocessing step or the postprocessing step is omitted. Accordingly, four following cases are available.

1) In case where both P and Q are the identity matrices
2) In case where P is the identity matrix and Q is not the identity matrix
3) In case where Q is the identity matrix and P is not the identity matrix
4) In case where both P and Q are not the identity matrices In cases 1) to 4), as an example for the case where P or Q is not the identity matrix, an orthogonal band matrix shown in Equation 17 above is available.

FIG. 17 above is an example for the 16×16 matrix which may be used as the preprocessing step P or the postprocessing step Q, and area A indicated by a shade may have the non-zero value and other areas are filled with a value of 0.

Further, when the matrix of FIG. 17 above is the orthogonal matrix, both the corresponding matrix and the transposed matrix are constituted by row vectors and column vectors in which a value of norm is 1, and different row vectors are orthogonal and different column vectors are also orthogonal. Here, orthogonal means that the area becomes the value of 0 when taking an inner product.

In FIG. 17 above, only the case where the number of non-zero values for each row or column is presented, but the number of non-zero values may be configured to be another number. Further, as the matrix which may be used as the preprocessing step P or the postprocessing step Q, other matrices other than the types of FIG. 17 above are available and for example, a specific orthogonal matrix is also available.

Embodiment 3: Method for Sharing Preprocessing Matrix and Postprocessing Matrix Between Multiple Transforms It is assumed that DCT5, DCT8, DST1, and DST7 may be approximated as shown in Equation 19 below. All P and Q in Equation 19 above are the same as dimensions of a transform matrix to be approximated. That is, when a forward DST7 transform matrix of the N×N matrix is to be approximated, corresponding P and Q have an N×N dimension.

$$(C_N^V)^T \approx Q_{C_N^V}(C_N^{II})^T P_{C_N^V}, C_N^V \approx P_{C_N^V}^T (C_N^{III})^T Q_{C_N^V}^T$$

$$(C_N^{VIII})^T \approx Q_{C_N^{VIII}}(C_N^{III})^T P_{C_N^{VIII}}, C_N^{VIII} \approx P_{C_N^{VIII}}^T (C_N^{III})^T Q_{C_N^{VIII}}^T$$

$$(S_N^I)^T \approx Q_{S_N^I}(S_N^{II})^T P_{S_N^I}, S_N^I \approx P_{S_N^I}^T (S_N^{III})^T Q_{S_N^I}^T$$

$$(S_N^{VII})^T \approx Q_{S_N^{VII}}(S_N^{III})^T P_{S_N^{VII}}, S_N^{VII} \approx P_{S_N^{VII}}^T (S_N^{II})^T Q_{S_N^{VII}}^T \quad \text{[Equation 19]}$$

P and Q in Equation 19 above may be the identity matrices as mentioned in Embodiment 2 above. However, the present disclosure is not limited thereto and the P and Q may not be the identity matrix.

When the relational equation between DST7 and DCT8, the relational equation between DST2 and DCT2, and the relational equation between DST3 and DCT3 presented in Equation 11 above are organized again, the relational equations are shown in Equation 20 below.

$$C_N^{II} = D_N S_N^{II} J_N, (C_N^{II})^T = J_N (S_N^{II})^T D_N$$

$$C_N^{III} = J_N S_N^{III} D_N, (C_N^{III})^T = D_N (S_N^{III})^T J_N$$

$$C_N^{VIII} = J_N S_N^{VII} D_N, (C_N^{VIII})^T = D_N (S_N^{VII})^T J_N$$

$$S_N^{II} = D_N C_N^{II} J_N, (S_N^{II})^T = J_N (C_N^{II})^T D_N$$

$$S_N^{III} = J_N C_N^{III} D_N, (S_N^{III})^T = D_N (C_N^{III})^T J_N$$

$$S_N^{VII} = J_N C_N^{VIII} D_N, (S_N^{VII})^T = D_N (C_N^{VIII})^T J_N \quad \text{[Equation 20]}$$

When the relational equations in Equations 19 and 20 above, DCT8 may be expressed as in Equation 21 below.

$$(C_N^{VIII})^T \approx Q_{C_N^{VIII}}(C_N^{III})^T P_{C_N^{VIII}}$$

$$(C_N^{VIII})^T = D_N(S_N^{VII})^T J_N \approx D_N Q_{S_N^{VII}}$$
$$(S_N^{III})^T P_{S_N^{VII}} J_N = D_N Q_{S_N^{VII}} D_N (C_N^{III})^T J_N P_{S_N^{VII}} J_N \quad \text{[Equation 21]}$$

When two equations in Equation 21 above are compared with each other, Equation 22 below may be configured to be established for the preprocessing matrix and the postprocessing matrix presented in Equation 19 above.

$$Q_{C_N^{VIII}} = D_N Q_{S_N^{VII}} D_N, Q_{S_N^{VII}} = D_N Q_{C_N^{VIII}} D_N$$

$$P_{C_N^{VIII}} = J_N P_{S_N^{VII}} J_N, P_{S_N^{VII}} = J_N P_{C_N^{VIII}} J_N \quad \text{[Equation 22]}$$

From Equation 22 above, when only $P_{S_N^{VII}}$ and $Q_{S_N^{VII}}$ are stored, $P_{C_N^{VIII}}$ and $Q_{C_N^{VIII}}$ may be derived from $P_{S_N^{VII}}$ and $Q_{S_N^{VII}}$ without a need of separately storing $P_{C_N^{VIII}}$ and $Q_{C_N^{VIII}}$.

For a specific matrix A, $AD_N$ represents that column vectors of A are multiplied by +/− and $D_N A$ represents that the column vectors of A are multiplied by +/−. Here, $D_N$ represents a matrix in which 1 and −1 alternately appear only on a diagonal line.

Further, $AJ_N$ represents that an order of column vectors constituting A is arranged reversely and $J_N A$ represents the order of row vectors constituting A is arranged reversely. Here, $J_N$ represents a matrix having a value of 1 only on a reverse diagonal line.

When $Q_{S_N^{VII}}$ is the identity matrix in Equation 22 above, $Q_{C_N^{VIII}}$ also becomes the identity matrix and when $P_{S_N^{VII}}$ is the identity matrix, $P_{S_N^{VII}}$ also becomes the identity matrix.

When $(S_N^{III})^T$ is used instead of $(C_N^{III})^T$ at the time of approximating $(C_N^{VIII})^T$ in Equation 21 above, a preprocessing matrix for approximating $(C_N^{VIII})^T$ becomes $P_{S_N^{VII}} J_N$ and a postprocessing matrix becomes $D_N Q_{S_N^{VII}}$.

When flipped DST7 is used instead of DCT8 and the forward transform for flipped DST7 is written as $(\text{flip} S_N^{VII})^T$, Equation 23 below may be obtained. Here, flipped DST7 represents that elements constituting each vector are arranged reversely to all row-direction transform basis vectors in the forward transform matrix for DST7.

$$(\text{flip} S_N^{VII})^T \approx Q_{\text{flip} S_N^{VII}}(C_N^{III})^T P_{\text{flip} S_N^{VII}}$$

$$(\text{flip} S_N^{VII})^T = (S_N^{VII})^T J_N \approx Q_{S_N^{VII}}(S_N^{III})$$
$$^T P_{S_N^{VII}} J_N = Q_{S_N^{VII}} D_N (C_N^{III})^T J_N P_{S_N^{VII}} J_N \quad \text{[Equation 23]}$$

In Equation 23 above, it is assumed that $(\text{flip} S_N^{VII})^T$ is approximated by using $(C_N^{III})^T$ and the corresponding preprocessing matrix and postprocessing matrix are represented by $P_{\text{flip} S_N^{VII}}$ and $Q_{\text{flip} S_N^{VII}}$, respectively. A relationship shown in Equation 24 below may be configured to be satisfied between the preprocessing matrices and the postprocessing matrices by a similar scheme.

$$Q_{\text{flip} S_N^{VII}} = Q_{S_N^{VII}} D_N, Q_{S_N^{VII}} = Q_{\text{flip} S_N^{VII}} D_N$$

$$P_{\text{flip} S_N^{VII}} = J_N P_{S_N^{VII}} J_N, P_{S_N^{VII}} = J_N P_{\text{flip} S_N^{VII}} J_N \quad \text{[Equation 24]}$$

As an embodiment, in Equation 24 above, when only $P_{S_N^{VII}}$ and $Q_{S_N^{VII}}$ are stored, $P_{\text{flip} P_N^{VII}}$ and $Q_{\text{flip} P_N^{VII}}$ may be derived from $P_{S_N^{VII}}$ and $Q_{S_N^{VII}}$ without a need of separately storing $P_{\text{flip} S_N^{VII}}$ and $Q_{\text{flip} S_N^{VII}}$.

Further, as presented in Equation 24 above, when $(S_N^{III})^T$ is used instead of $(C_N^{III})^T$ at the time of approximating $(\text{flip} S_N^{VII})^T$, the preprocessing matrix for approximating $(\text{flip} S_N^{VII})^T$ becomes $P_{S_N^{VII}} J_N$ and the postprocessing matrix becomes $Q_{S_N^{VII}}$, and as a result, the corresponding preprocessing matrix and postprocessing matrix may be similarly derived from $P_{S_N^{VII}}$ and $Q_{S_N^{VII}}$.

As described above, provided is the method for deriving the preprocessing matrix and the postprocessing matrix for DCT8 or flipped DST7 from the preprocessing matrix and the postprocessing matrix for DST7.

As another embodiment, the preprocessing matrix and the postprocessing matrix may be derived from the preprocessing matrix and the postprocessing matrix for DCT8 or flipped DST7. A relational equation shown in Equation 25 below may be obtained from Equations 19 and 20 above.

$$(S_N^{VII})^T \approx Q_{S_N}^{VII}(S_N^{III})^T P_{S_N^{VII}}$$

$$(S_N^{VII})^T = D_N(C_N^{VIII})^T J_N \approx D_N Q_{C_N}^{VIII}(C_N^{III})^T P_{C_N^{VIII}} D_N$$
$$(S_N^{III})^T J_N P_{C_N^{VIII}} J_N \quad \text{[Equation 25]}$$

The relational equation in Equation 22 above may be configured to be satisfied from two equations of Equation 25 above. Accordingly, in opposition to the above case, it may be configured so that only $P_{C_N^{VIII}}$ and $Q_{C_N^{VIII}}$ are stored and $P_{S_N^{VII}}$ and $Q_{S_N^{VII}}$ are derived therefrom.

When $(S_N^{VII})^T$ is approximated not to $(S_N^{III})^T$ but through $(C_N^{III})^T$, it may be configured to apply $P_{C_N^{VIII}} J_N$ to the preprocessing matrix and apply $D_N Q_{C_N^{VIII}}$ to the postprocessing matrix from Equation 25 above.

Meanwhile, the relational equation considering flipped DST7 is shown in Equation 26 below.

$$(\text{flip} S_N^{VII})^T \approx Q_{\text{flip} S_N}^{VII}(C_N^{III})^T P_{\text{flip} S_N^{VII}}$$

$$(S_N^{VII})^T = (\text{flip} S_N^{VII})^T J_N \approx Q_{\text{flip} S_N}^{VII}$$
$$(C_N^{III})^T P_{\text{flip} S_N^{VII}} J_N = Q_{\text{flip} S_N}^{VII} D_N(S_N^{III})^T J_N$$
$$P_{\text{flip} S_N^{VII}} J_N \quad \text{[Equation 26]}$$

It can be seen that Equation 24 above may be configured to be satisfied from Equation 26 above. Further, it can be seen that when $(S_N^{VII})^T$ is approximated to $(S_N^{III})^T$ from Equation 26 above, the preprocessing matrix becomes $J_N P_{\text{flip} S_N}^{VII} J_N$ and the postprocessing matrix becomes $Q_{\text{flip} S_N}^{VII} D_N$. Accordingly, it may be configured so that only $P_{\text{flip} S_N^{VII}}$ and $Q_{\text{flip} S_N^{VII}}$ are stored and $P_{S_N^{VII}}$ and $Q_{S_N^{VII}}$ are derived therefrom.

When $(S_N^{VII})^T$ is approximated not to $(S_N^{III})^T$ but through $(C_N^{III})^T$, it may be configured to apply $P_{\text{flip} S_N^{VII}} J_N$ to the preprocessing matrix and apply $Q_{\text{flip} S_N^{VII}}$ to the postprocessing matrix from Equation 26 above.

As another embodiment, since DST6 has a transpose form of DST7, Equation 27 below may be obtained when using the relational equations of Equations 19 and 20 above.

$$(S_N^{VI})^T = S_N^{VII} \approx P_{S_N^{VII}}^T (S_N^{II})^T Q_{S_N^{VII}}^T$$

$$(S_N^{VI})^T = J_N C_N^{VIII} D_N \approx J_N P_{C_N^{VIII}}^T (C_N^{II})^T Q_{C_N^{VIII}}^T D_N \quad \text{[Equation 27]}$$

When $(S_N^{II})^T$ is applied in order to approximate $(S_N^{VI})^T$, the preprocessing matrix becomes $Q_{S_N^{VII}}^T$ and the postprocessing matrix becomes $P_{S_N^{VII}}^T$, and as a result, the preprocessing matrix and the postprocessing matrix for $(S_N^{VI})^T$ may be derived from the preprocessing matrix and the postprocessing matrix for $(S_N^{VI})^T$.

Accordingly, a separate memory space is not required to store the preprocessing matrix and the postprocessing matrix for approximating $(S_N^{VI})^T$.

Similarly, when $(C_N^{II})^T$ is used in order to approximate $(S_N^{VI})^T$, $Q_{C_N^{VIII}}^T D_N$ may be used as the preprocessing matrix and $J_N P_{C_N^{VIII}}^T$ may be used as the postprocessing matrix as shown in Equation 27, and as a result, similarly, a separate preprocessing matrix and a separate postprocessing matrix for $(S_N^{VI})^T$ are not required.

When the preprocessing matrix and the postprocessing matrix for approximating $(S_N^{VI})^T$ are $P_{S_N^{VI}}$ and $Q_{S_N^{VI}}$ as shown in Equation 28 below, the preprocessing matrix and the postprocessing matrix for $(S_N^{VII})^T$ may be derived from $P_{S_N^{VI}}$ and $Q_{S_N^{VI}}$, and similarly, the preprocessing matrix and the postprocessing matrix for $(C_N^{VIII})^T$ may also be derived from $P_{S_N^{VI}}$ and $Q_{S_N^{VI}}$.

$$(S_N^{VI})^T \approx Q_{S_N^{VI}}(S_N^{II})^T P_{S_N^{VI}}$$

$$(S_N^{VII})^T = S_N^{VI} \approx P_{S_N^{VI}}^T (S_N^{III})^T Q_{S_N^{VI}}^T = P_{S_N^{VI}}^T D_N$$
$$(C_N^{III})^T J_N Q_{S_N^{VI}}^T$$

$$(C_N^{VIII})^T = D_N(S_N^{VII})^T J_N \approx D_N P_{S_N^{VI}}^T$$
$$(S_N^{III})^T Q_{S_N^{VI}}^T J_N = D_N P_{S_N^{VI}}^T D_N(C_N^{III})^T J_N Q_{S_N^{VI}}^T$$
$$J_N \quad \text{[Equation 28]}$$

When $(S_N^{VII})^T$ is approximated to $(S_N^{III})^T$ as shown in Equation 28 above, the preprocessing matrix and the postprocessing matrix become $Q_{S_N^{VI}}^T$ and $P_{S_N^{VI}}^T$, respectively and when $(S_N^{VII})^T$ is approximated to $(C_N^{III})^T$, the preprocessing matrix and the postprocessing matrix become $J_N Q_{S_N^{VI}}^T$ and $P_{S_N^{VI}}^T D_N$, respectively.

Similarly, when $(C_N^{VIII})^T$ approximated to $(S_N^{III})^T$, the preprocessing matrix and the postprocessing matrix become $Q_{S_N^{VI}}^T J_N$, and $D_N P_{S_N^{VI}}^T$, respectively and when $(C_N^{VIII})^T$ is approximated to $(C_N^{III})^T$, the preprocessing matrix and the postprocessing matrix become $J_N Q_{S_N^{VI}}^T J_N$ and $D_N P_{S_N^{VI}}^T D_N$, respectively.

Consequently, in the present disclosure, when the MTS transform combination is configured by using some of DST7, DCT8, DST6, and flipped DST7 or DST7, DCT8, DST6, and flipped DST7, the preprocessing matrix and the postprocessing matrix of another transform may be derived by using one preprocessing matrix and the one postprocessing matrix at the time of approximating the forward transform and the inverse transform of DST7, DCT8, DST6, and flipped DST7 by using $(S_N^{II})^T$, $(S_N^{III})^T$, $(C_N^{II})^T$, and $(C_N^{III})^T$.

Accordingly, a memory required for storing the preprocessing matrices and the postprocessing matrices for all transforms used for the MTS transform combination may be reduced.

As described above, it can be seen that all of $(S_N^{II})^T$, $(S_N^{III})^T$, and $(C_N^{III})^T$ are derived from $(C_N^{II})^T$ from the relational equations of Equations 9, 10, and 20. Similarly, all other transforms may be derived from any one the four transforms. That is, all other transforms may be derived by applying calculations of the transpose, $J_N$, and $D_N$. Here, the calculations are just calculations of changing an order or symbol.

Accordingly, when $(S_N^{II})^T$, $(S_N^{III})^T$, $(C_N^{II})^T$, and $(C_N^{III})^T$ are used in order to approximate multiple transforms, only a transform kernel for $(C_N^{II})^T$ is actually stored, and as a result, it is possible to reduce the memory space.

Consequently, when the MTS transform combination is configured by using some of DST7, DCT8, DST6, and flipped DST7 or DST7, DCT8, DST6, and flipped DST7, only a memory for $(C_N^{II})^T$ and a memory for storing one preprocessing matrix and one postprocessing matrix are required. When only one of the preprocessing or the postprocessing is applied (i.e., when the other one is the identity matrix), only one matrix corresponding to the preprocessing or postprocessing is stored.

Further, in the present disclosure, a case of approximating a specific transform (e.g., $(S_N^{VII})^T$) to another transform (e.g., $(S_N^{III})^T$) like $(S_N^{VII})^T \approx Q_{S_N}^{VII}(S_N^{III})^T P_{S_N^{VII}}$ is described, but $Q_{S_N}^{VII}(S_N^{III})^T P_{S_N^{VII}}$ may be used as one independent transform regardless of approximation or not.

Further, $Q_{S_N}^{VII}(S_N^{III})^T P_{S_N^{VII}}$ may be independently applied even to all transforms including the preprocessing matrix and the postprocessing matrix which appear in the present disclosure regardless of the approximation or not.

FIGS. 18 and 19 are embodiments to which the present disclosure is applied, and FIG. 18 illustrates MTS mapping for an intra prediction residual and FIG. 19 illustrates MTS mapping for an inter prediction residual.

Embodiment 4: Various Embodiments of Applying Preprocessing Matrix and Postprocessing Matrix When the preprocessing matrix or postprocessing matrix is applied to $(S_N^{II})^T$, $(S_N^{III})^T$, $(C_N^{II})^T$, and $(C_N^{III})^T$ as shown in Equation 19 above, the preprocessing matrix or postprocessing matrix may be selectively applied according to a case (or a specific condition). Detailed embodiments are as follows.

In (Embodiment 4-1), whether to apply the preprocessing or postprocessing may vary for each case.

For example, whether to apply the preprocessing and the postprocessing may be on/off according to the intra prediction mode and whether to apply the preprocessing and the postprocessing may be on/off even for each of the horizontal transform and the vertical transform.

Further, whether to apply the preprocessing and the postprocessing may be on/off independently. For example, the preprocessing may be turned on and the postprocessing may be turned off for the horizontal transform of the planar mode and the preprocessing may be turned off and the postprocessing may be turned on for the vertical transform.

Further, since only one of both the preprocessing and the postprocessing may be applied, when there is only the preprocessing, for example, on/off may be applied only to the preprocessing according to the case.

In (Embodiment 4-2), flags for whether to apply the preprocessing and the postprocessing may be signaled.

For example, when a transform to be applied to a specific condition (e.g., for a specific intra prediction mode) is determined, the flag is separately signaled to specify whether to apply the preprocessing matrix and the postprocessing matrix. For example, $(S_N^{III})^T$ may be applied, and $P_{S_N^{VII}}$ may be used as the preprocessing matrix and $Q_{S_N^{VII}}$ may be used as the postprocessing matrix.

Further, whether to apply the preprocessing matrix and the postprocessing matrix may be specified through one flag and whether to apply the preprocessing matrix and the postprocessing matrix may be specified by separate flags, respectively.

When only one flag is used, whether to apply the preprocessing matrix and the postprocessing matrix may be specified according to whether the flag is 0 or 1. For example, when the flag is 0, the preprocessing matrix is not applied and the postprocessing matrix is applied and when the flag is 1, the preprocessing matrix is applied and the postprocessing matrix is not applied.

As another embodiment, in Equation 19 above, how the forward transform and the inverse transform may be approximated to each of DCT5, DCT8, DST1, and DST7 is presented. As shown in Equation 19 above, when matrices are multiplied reversely to an order applied in the forward transform and each matrix is multiplied in the form of the transpose, the inverse transform is made. Here, from a fact that the forward DCT8 transform and the inverse DCT8 transform are the same as each other and the forward DST1 transform and the inverse DST1 transform are the same as each other, forward (inverse) DCT8 may be applied instead of inverse (forward) DCT8. Similarly, the forward (inverse) DST1 may be applied instead of the inverse (forward) DST1.

The embodiments described in the present disclosure may be applied to all MTS transform combinations of applying trigonometric transforms. For example, an approximation method (i.e., an approximation method to a preprocessing step and a postprocessing step) in Embodiments 2 and 3 above may be applied to a case of applying DST7 among the MTS transform combinations.

Besides, the approximation method in Embodiments 2 and 3 above may be applied even to DCT8, DST1, DCT5, etc.

As an embodiment, when the MTS transform combination is used, DST7, DCT8, DST1, and DCT5 may be approximated by using DST2, DST3, DCT2, and DCT3, and the postprocessing may be configured no to be applied and only the preprocessing may be configured to be applied. This is shown in Equation 29 below.

$$(C_N^V)^T \approx (C_N^{II})^T P_{C_N^V}, C_N^V \approx P_{C_N^V}^T (C_N^{III})^T$$

$$(C_N^{VIII})^T \approx (C_N^{II})^T P_{C_N^{VIII}}, C_N^{VIII} \approx P_{C_N^{VIII}}^T (C_N^{II})^T$$

$$(S_N^I)^T \approx (S_N^{II})^T P_{S_N^I}, S_N^I \approx P_{S_N^I}^T (S_N^{III})^T$$

$$(S_N^{VII})^T \approx (S_N^{III})^T P_{S_N^{VII}}, S_N^{VII} \approx P_{S_N^{VII}}^T (S_N^{II})^T \quad \text{[Equation 29]}$$

When the inverse transform is applied as shown in Equation 29 above, the preprocessing matrix in the forward transform is transposed and applied to the postprocessing matrix. As shown in Equation 30 below, only the postprocessing may be configured to be applied without applying the preprocessing.

$$(C_N^V)^T \approx Q_{C_N^V}(C_N^{II})^T, C_N^V \approx (C_N^{VII})^T Q_{C_N^V}^T$$

$$(C_N^{VIII})^T \approx Q_{C_N^{VIII}}(C_N^{III})^T, C_N^{VIII} \approx (C_N^{II})^T Q_{C_N^{VIII}}^T$$

$$(S_N^I)^T \approx Q_{S_N^I}(S_N^{II})^T, S_N^I \approx (S_N^{III})^T Q_{S_N^I}^T$$

$$(S_N^{VII})^T \approx Q_{S_N^{VII}}(S_N^{III})^T, S_N^{VII} \approx (S_N^{II})^T Q_{S_N^{VII}}^T \quad \text{[Equation 30]}$$

The preprocessing or postprocessing matrices in Equations 29 and 30 above may be orthogonal band matrices shown in Equation 17 above.

All of $(S_N^{II})^T$, $(S_N^{III})^T$, and $(C_N^{III})^T$ may be configured to be applied by using only $(C_N^{II})^T$ from Equations 9, 10, and 20 above. This is shown in Equation 31 below.

$$(C_N^{III})^T = C_N^{II}, C_N^{III} = (C_N^{II})^T$$

$$(S_N^{II})^T = J_N(C_N^{II})^T D_N, S_N^{II} = D_N C_N^{II} J_N$$

$$(S_N^{III})^T = S_N^{II} = D_N C_N^{II} J_N, S_N^{III} = J_N (C_N^{II})^T D_N \quad \text{[Equation 31]}$$

FIGS. 18 and 19 above illustrate embodiments of the MTS transform combination.

For example, only DCT8 and DST7 may be used for generating the MTS. For example, FIGS. 18 and 19 above illustrate MTS examples for an intra-predicted residual and an inter-predicted residual, respectively.

The approximation method proposed in the present disclosure may be applied to both DST7 and DCT8 of FIGS. 18 and 19. For example, a method for deriving the preprocessing matrix and the postprocessing matrix of the other transform from the preprocessing matrix and the postprocessing matrix for one transform may be applied.

Further, other transforms other than DST7, DCT8, DST1, and DCT5 may also be approximated by the scheme shown in Equation 19 above. This is shown in Equation 32 below.

$$(A)^T \approx Q_A(B)^T P_A, A \approx P_A^T B Q_A^T \quad \text{[Equation 32]}$$

Equation 32 above may show a case of approximating $(A)^T$ to $(B)^T$ and A and B may correspond to all trigonometric transforms $(C_N^I)$ to $(C_N^{VIII})$ and $(S_N^I)$ to $(S_N^{VIII})$. Equation 33 below shows an example of following the form of Equation 32 above.

$$(S_N^{IV})^T \approx Q_{S_N^{IV}}(S_N^{III})^T P_{S_N^{II}}, S_N^{IV} \approx P_{S_N^{II}}^T (S_N^{II})^T Q_{S_N^{IV}}^T$$

$$(C_N^{IV})^T \approx Q_{C_N^{IV}}(C_N^{III})^T P_{C_N^{IV}}, C_N^{IV} \approx P_{C_N^{IV}}^T (C_N^{II})^T$$
$$Q_{C_N^{IV}}^T \quad \text{[Equation 33]}$$

Accordingly, in the MTS transform combination to which DST4 or DCT4 is applied, an approximation type matrix calculation shown in Equation 33 above may be applied instead of DST4 or DCT4.

FIG. 20 is a flowchart of encoding a video signal by using an approximation transform based on a preprocessing/postprocessing matrix as an embodiment to which the present disclosure is applied.

An encoder may determine (or select) primary transforms (hereinafter, may be referred to as a horizontal primary transform and a vertical primary transform, respectively) for the horizontal and vertical directions based on at least one of a prediction mode, a block shape, and/or a block size of the current block (S2010). In this case, a candidate of the primary transform for the horizontal/vertical direction may include at least one of the embodiments of FIG. 6 above, and the embodiments of FIG. 18 and/or FIG. 19 above.

The encoder may determine an optimal horizontal primary transform and/or an optimal vertical primary transform through Rate Distortion optimization. The optimal primary horizontal transform and/or the optimal vertical primary transform may correspond to one of a plurality of transform combinations and the plurality of transform combinations may be defined by a transform index.

The encoder may signal the transform index corresponding to the optimal horizontal primary transform and/or the optimal vertical primary transform (S2020). Here, the transform index may adopt other embodiments described in the present disclosure. For example, the embodiments may include at least one of the embodiments of FIG. 6 above, and the embodiments of FIGS. 18 and 19 above.

As another example, a horizontal transform index for the optimal horizontal primary transform and a vertical transform index for the optimal vertical primary transform may be independently signaled.

The encoder may perform a forward primary approximation transform for the current block for the horizontal direction by using the optimal horizontal primary transform (S2030). Here, the current block may mean a transform block.

In addition, the encoder may perform the forward primary approximation transform for the current block for the vertical direction by using the optimal vertical primary transform (S2040).

Here, the forward primary approximation transform represents a transform generated by multiplying the optimal horizontal primary transform or the optimal vertical primary transform by the preprocessing matrix and the postprocessing matrix.

For example, the forward primary approximation transform may be generated by Equation 18 above.

As an embodiment, at least one of the preprocessing matrix and the postprocessing matrix may be an identity matrix.

As an embodiment, the preprocessing matrix and the postprocessing matrix may be orthogonal band matrices. Here, the orthogonal band matrix represents a matrix in which a specific diagonal region of an N×N matrix has a non-zero value and other regions are filled with a value of 0. For example, in the specific diagonal region, the number of non-zero values for each row or column may be 4 or 3.

As an embodiment, when an MTS transform combination is configured by using at least one of DST7, DCT8, DST6, or flipped DST7, a forward transform and an inverse transform of DST7, DCT8, DST6, or flipped DST7 may be approximated by using at least one of $(S_N^{II})^T$, $(S_N^{III})^T$, $(C_N^{II})^T$, and $(C_N^{III})^T$. That is, the preprocessing matrix and the postprocessing matrix of other transform may be derived by using one preprocessing matrix and one postprocessing matrix.

Further, in the embodiment, the vertical transform is performed after the horizontal transform is performed, but the present disclosure is not limited thereto. That is, the vertical transform may be first performed and then the horizontal transform may be performed.

As an embodiment, forward DST4 may be applied in a horizontal forward transform in step S2030 above and forward DCT4 may be applied in a vertical forward transform in step S2040 above. Or vice versa.

As an embodiment, a combination of the horizontal transform and the vertical transform may include at least one of the embodiments of FIG. 6 above and embodiments of FIGS. 18 and 19 to be described below.

Meanwhile, the encoder performs quantization for the current block to generate a transform coefficient block (S2050).

The encoder performs entropy encoding for the transform coefficient block to generate the bitstream.

FIG. 21 is a flowchart of decoding a video signal by using an approximation transform based on a preprocessing/postprocessing matrix as an embodiment to which the present disclosure is applied.

A decoder may obtain a transform index from a bitstream (S2110). Here, the transform index may adopt other embodiments described in the present disclosure. For example, the embodiments may include at least one of the embodiments of FIG. 6 above, and the embodiments of FIGS. 18 and 19 above.

The decoder may derive a horizontal/vertical primary transform corresponding to the transform index (S2120). In this case, a candidate of the horizontal/vertical primary transform may include at least one of the embodiments of FIG. 6 above, and the embodiments of FIG. 18 and/or FIG. 19 above.

However, steps S2110 and S2120 are embodiments and the present disclosure is not limited thereto. For example, the decoder may derive the horizontal/vertical primary transform based on at least one of a prediction mode, a block shape, and/or a block size of the current block. As another example, the transform index may include a horizontal transform index corresponding to a horizontal transform and a vertical transform index corresponding to a vertical transform.

Meanwhile, the decoder may obtain the transform coefficient block by entropy-decoding the bitstream and perform dequantization for the transform coefficient block (S2130).

The decoder may perform an inverse primary approximation transform in a vertical direction by using the vertical primary transform for the dequantized transform coefficient block (S2140).

In addition, the decoder may perform the inverse primary approximation transform in a horizontal direction by using the horizontal primary transform (S2150).

Here, the inverse primary approximation transform represents a transform generated by multiplying the horizontal primary transform or the vertical primary transform by the preprocessing matrix and the postprocessing matrix.

For example, the inverse primary approximation transform may be generated by Equation 18 above.

As an embodiment, at least one of the preprocessing matrix and the postprocessing matrix may be an identity matrix.

As an embodiment, the preprocessing matrix and the postprocessing matrix may be orthogonal band matrices.

Here, the orthogonal band matrix represents a matrix in which a specific diagonal region of an N×N matrix has a non-zero value and other regions are filled with a value of 0. For example, in the specific diagonal region, the number of non-zero values for each row or column may be 4 or 3.

As an embodiment, when an MTS transform combination is configured by using at least one of DST7, DCT8, DST6, or flipped DST7, a forward transform and an inverse transform of DST7, DCT8, DST6, or flipped DST7 may be approximated by using at least one of $(S_N^{II})^T$, $(S_N^{III})^T$, $(C_N^{II})^T$, and $(C_N^{III})^T$. That is, the preprocessing matrix and the postprocessing matrix of other transform may be derived by using one preprocessing matrix and one postprocessing matrix.

Further, in the embodiment, the horizontal transform is applied after the vertical transform is applied, but the present disclosure is not limited thereto. That is, the horizontal transform may be first applied and then the vertical transform may be performed.

As an embodiment, inverse DST4 may be applied in a vertical inverse transform in step S2140 above and inverse DCT4 may be applied in a horizontal inverse transform in step S2150 above. Or vice versa.

As an embodiment, a combination of the horizontal transform and the vertical transform may include at least one of the embodiments of FIG. 6 above and embodiments of FIGS. 18 and 19 to be described below.

The decoder generates a residual block through step S2150 and the residual block and a prediction block are added to generate a reconstruction block.

FIG. 22 illustrates a content streaming system to which the disclosure is applied.

Referring to FIG. 22, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for reconstructing a video signal by using an approximation transform based on a preprocessing/postprocessing matrix by an apparatus, the method comprising:
   obtaining a transform index of a current block from a video signal, wherein the transform index corresponds to any one of a plurality of transform combinations including at least one of DST7, DCT8, DST6, or flipped DST7, and a transform combination includes a horizontal transform and a vertical transform;
   deriving a primary transform for horizontal/vertical directions corresponding to the transform index;
   performing an inverse primary approximation transform based on the primary transform for the horizontal/vertical directions, wherein the inverse primary approximation transform is generated by multiplying the primary transform for the horizontal/vertical directions by a preprocessing matrix and a postprocessing matrix; and
   reconstructing the video signal based on the inverse primary approximation-transformed current block.

2. The method of claim 1, wherein the preprocessing matrix and the postprocessing matrix represent an orthogonal band matrix and the orthogonal band matrix is a matrix in which a specific diagonal region of a matrix has a non-zero value and other regions have a value of 0.

3. The method of claim 2, wherein in the specific diagonal region, the number of non-zero values for each row or column is 4 or 3.

4. The method of claim 1, wherein at least one of the preprocessing matrix and the postprocessing matrix is an identity matrix.

5. The method of claim 1, wherein the transform combination includes at least one of DST7, DCT8, DST6, or flipped DST7, and
   wherein the inverse primary approximation transform is approximated based on at least one of $(S_N^{II})^T$, $(S_N^{III})^T$, $(C_N^{II})^T$, and $(C_N^{III})^T$, where S or C represents DST or DCT, II or III represents a type number of a transform, and N represent a size of the transform.

6. The method of claim 1, wherein when the current block is an intra-predicted residual,
   the transform combinations (horizontal transform, vertical transform) include (DST7, DST7), (DCT8, DST7), (DST7, DCT8), and (DCT8, DCT8), and
   the transform indexes corresponding to the transform combinations are 0, 1, 2, and 3, respectively.

7. The method of claim 1, wherein when the current block is an inter-predicted residual,
   the transform combinations (horizontal transform, vertical transform) include (DCT8, DCT8), (DST7, DCT8), (DCT8, DST7), and (DST7, DST7), and
   the transform indexes corresponding to the transform combinations are 0, 1, 2, and 3, respectively.

8. An apparatus for reconstructing a video signal by using an approximation transform based on a preprocessing/postprocessing matrix, the apparatus comprising:
   a memory;
   a processor coupled to the memory and configured to
   obtain a transform index of a current block from a video signal, wherein the transform index corresponds to any one of a plurality of transform combinations including at least one of DST7, DCT8, DST6, or flipped DST7, and the transform combination includes a horizontal transform and a vertical transform;
   derive a primary transform for horizontal/vertical directions corresponding to the transform index and performing an inverse primary approximation transform based on the primary transform for the horizontal/vertical directions, wherein the inverse primary approximation transform is generated by multiplying the primary transform for the horizontal/vertical directions by a preprocessing matrix and a postprocessing matrix; and
   reconstruct the video signal based on the inverse primary approximation-transformed current block.

9. The apparatus of claim 8, wherein the preprocessing matrix and the postprocessing matrix represent an orthogonal band matrix and the orthogonal band matrix is a matrix in which a specific diagonal region of a matrix has a non-zero value and other regions have a value of 0.

10. The apparatus of claim 9, wherein in the specific diagonal region, the number of non-zero values for each row or column is 4 or 3.

11. The apparatus of claim 8, wherein at least one of the preprocessing matrix and the postprocessing matrix is an identity matrix.

12. The apparatus of claim 8, wherein the transform combination includes at least one of DST7, DCT8, DST6, or flipped DST7, and
   wherein the inverse primary approximation transform is approximated based on at least one of $(S_N^{II})^T$, $(S_N^{III})^T$, $(C_N^{II})^T$, and $(C_N^{III})^T$, where S or C represents DST or DCT, II or III represents a type number of a transform, and N represent a size of the transform.

13. The apparatus of claim 8, wherein when the current block is an intra-predicted residual,
   the transform combinations (horizontal transform, vertical transform) include (DST7, DST7), (DCT8, DST7), (DST7, DCT8), and (DCT8, DCT8), and
   the transform indexes corresponding to the transform combinations are 0, 1, 2, and 3, respectively.

14. The apparatus of claim 8, wherein when the current block is an inter-predicted residual,
   the transform combinations (horizontal transform, vertical transform) include (DCT8, DCT8), (DST7, DCT8), (DCT8, DST7), and (DST7, DST7), and
   the transform indexes corresponding to the transform combinations are 0, 1, 2, and 3, respectively.

* * * * *